United States Patent [19]
Donaldson et al.

[11] Patent Number: 5,500,737
[45] Date of Patent: Mar. 19, 1996

[54] METHOD FOR MEASURING THE CONTOUR OF A SURFACE

[75] Inventors: Charles W. Donaldson; Kenneth E. Miller; John J. Lestage, all of Cincinnati; Randall C. Gantner, Dayton, all of Ohio

[73] Assignee: General Electric Company, Cincinnati, Ohio

[21] Appl. No.: 94,680

[22] Filed: Jul. 21, 1993

[51] Int. Cl.⁶ .................................................. G01B 11/24
[52] U.S. Cl. ......................................................... 356/376
[58] Field of Search ...................................... 356/376, 377

[56] References Cited

U.S. PATENT DOCUMENTS

| | | | |
|---|---|---|---|
| 3,625,618 | 12/1971 | Bickel | 356/120 |
| 4,180,322 | 12/1979 | Farcinade | 356/1 |
| 4,226,536 | 10/1980 | Dreyfus et al. | 356/376 |
| 4,325,640 | 4/1982 | Dreyfus et al. | 356/376 |
| 4,630,927 | 12/1986 | Fulkerson | 356/372 |
| 4,634,879 | 1/1987 | Penney | 250/560 |
| 4,705,401 | 11/1987 | Addleman et al. | 356/376 |
| 4,708,483 | 11/1987 | Lorenz | 356/376 |
| 4,724,480 | 2/1988 | Hecker et al. | 358/101 |
| 4,764,016 | 8/1988 | Johansson | 356/371 |
| 4,796,997 | 1/1989 | Svetkoff et al. | 356/376 |
| 4,875,777 | 10/1989 | Harding | 356/376 |
| 4,939,379 | 7/1990 | Horn | 250/560 |
| 5,090,811 | 2/1992 | Donaldson | 356/376 |
| 5,129,010 | 7/1992 | Higuchi et al. | 356/376 |

FOREIGN PATENT DOCUMENTS

| | | |
|---|---|---|
| 567980 | 11/1993 | European Pat. Off. . |
| 573661 | 12/1993 | European Pat. Off. . |
| 2536167 | 11/1982 | France . |
| 53-37457 | 6/1978 | Japan . |
| 64-31005 | 2/1989 | Japan . |
| 8300738 | 3/1983 | WIPO . |
| 08939 | 8/1990 | WIPO . |

OTHER PUBLICATIONS

"Non–Contact Measurement of Radii", by Charles W. Donaldson, GE, Leading Edge, Spring 1988, pp. 4–7. (no month).

"Improved Optical Design for Light Stripe Gages", by Kevin G. Harding, Dale Markham Industrial Technology Institute, SME Sensors '86. (no month).

"Sigma Optical Profilometer System, When the Inside of the Tubing is as Important as the Outside", Expanding the Horizons of Visibility, Sigma Research, Inc. Advertising Literature, Publication Date Unknown.

*Primary Examiner*—Richard A. Rosenberger
*Attorney, Agent, or Firm*—Andrew C. Hess; David L. Narciso

[57] ABSTRACT

A method for measuring the contour of a surface using a high intensity light source, optics for projecting a line of light on the surface to illuminate a selected contour feature of the surface, an optical detector which generates an image of the selected contour feature, and a processing unit which fits at least one contour segment to the image of the selected contour feature and determines contour characteristics from the contour segment. The method includes a calibration step which corrects for distortion and keystone effect in the image caused by off-axis imaging of the illuminated contour feature by adjusting vertical and horizontal grid lines of an electronically created image with the off-axis image of the contour surface.

1 Claim, 28 Drawing Sheets

METHOD FOR MEASURING THE CONTOUR OF A SURFACE

BACKGROUND OF THE INVENTION

The present invention relates to the measurement of contour features of surfaces and, more particularly, to a system using optical triangulation to measure a selected contour feature of a surface, including surfaces where contact of the apparatus or gage with the surface may contaminate or distort the surface, and to determine the conformance of the contour feature to a predefined specification.

Component parts for high performance machinery, such as those used in gas turbine engines for aircraft propulsion and the like, are manufactured to precise specifications and to avoid sharp edges and tight corners because such features are areas where stress concentrations can occur and increase the possibility of formation of a crack or other defect. Component part edges are, therefore, typically chamfered, curved to form a radius or otherwise contoured to dull the sharp edge to reduce the probability of crack formation and to improve fit between different components. Accurate measurement of contour features, such as edge and corner contours, is, therefore, important to ensure the quality of the component and its ability to resist crack formation and to fit properly with mating parts.

Presently used methods and devices for measuring the contour of edges and corners include hand-held contour gages, which are pre-cut to the radius or contour expected to be measured, impressions of the radius or contour expected to be measured, optical comparators, mechanical tracers and coordinate measuring machines. Contour inspection with pre-cut radius or contour gages involves placing gages of known radii or contour in contact with the component part surface and back illuminating both the part and the gage. If the contour of the part and the gage coincide, no light will pass between the part and the gage. If variations exist between the contour of the gage and the part, light will be allowed to pass between the gage and the part in varying degrees depending upon the extent of the variation. The extent of the error in the contour of the part is then determined by an inspector and is subject to his judgment. Thus, such measurements or inspections are dependent upon the skill and vitality of the inspector and operator and may be subject to error and difficult to replicate. Additionally, the use of pre-cut radius or contour gages becomes impractical with significant loss of accuracy as the contours being measured become smaller and/or include compound radii or contour features.

Simple and compound contour features can be measured by forming an impression of the contour surface feature using dental wax or other suitable material. The wax impression is then evaluated using an optical comparator or a mechanical tracing device which is usually located in an area removed from the component under inspection. The comparator or mechanical tracer utilizes a template or screen with the desired contour at the proper magnification for comparison with the wax impression. Again, this method and apparatus is dependent upon the skill and judgment of the operator or inspector and may be subject to inaccuracies. If the component part to be measured is movable, the contour feature may be measured directly on the optical comparator or tracer. The component part must be fixtured on the comparator or tracer which can represent quite a challenge if the component is large or has an unusual shape. This method, while avoiding any inaccuracies associated with forming the wax impression of the system previously described because the part is measured directly, would, however, still suffer from the same disadvantages described hereinabove.

Coordinate measuring machines are another well known device for measuring surface contour features and provide relatively accurate results when measuring large radii. These devices, however, are expensive, have slow processing rates and are not easily adaptable to a production environment.

Critical components with complex geometries, such as those used in gas turbine engines for aircraft propulsion, add complexity and present a challenge with respect to the measurement of edge and corner contours by using any of the devices or methods described hereinabove. The surfaces of such components may contain compound curvatures, edges and corners which are difficult to access, and the components themselves may be difficult to manipulate and move from one location to another for ease of securing measurements.

Therefore, a need exists for a portable, highly maneuverable hand-held contour measuring device which can provide fast and accurate results and is not subject to the foregoing disadvantages.

It is, accordingly, a primary object of the present invention to provide a novel apparatus for measuring the contour of a surface which is not subject to the foregoing disadvantages.

It is another object of the present invention to provide a hand-held highly maneuverable device which permits quick and accurate measurement of a contour feature of a surface.

It is a further object of the present invention to provide an apparatus which permits selective measurement of a plurality of different contour type features.

These and other objects of the invention, together with features and advantages thereof, will become apparent from the following detailed specification when read with the accompanying drawings in which like reference numerals refer to like elements.

SUMMARY OF THE INVENTION

In accordance with the present invention, an apparatus for measuring the contour of a surface includes a high intensity light source and associated optics for projecting a line of light onto the surface to illuminate a selected contour feature of the surface. An optical detector or camera and any associated optics are positioned to generate an image of the selected contour feature illuminated by the line of light. Means for fitting at least one contour line segment to the image of the contour feature and means for determining a set of contour features or characteristics from the at least one contour feature are provided.

DETAILED DESCRIPTION OF THE PREFERRED EMBODIMENTS

Figure 1:
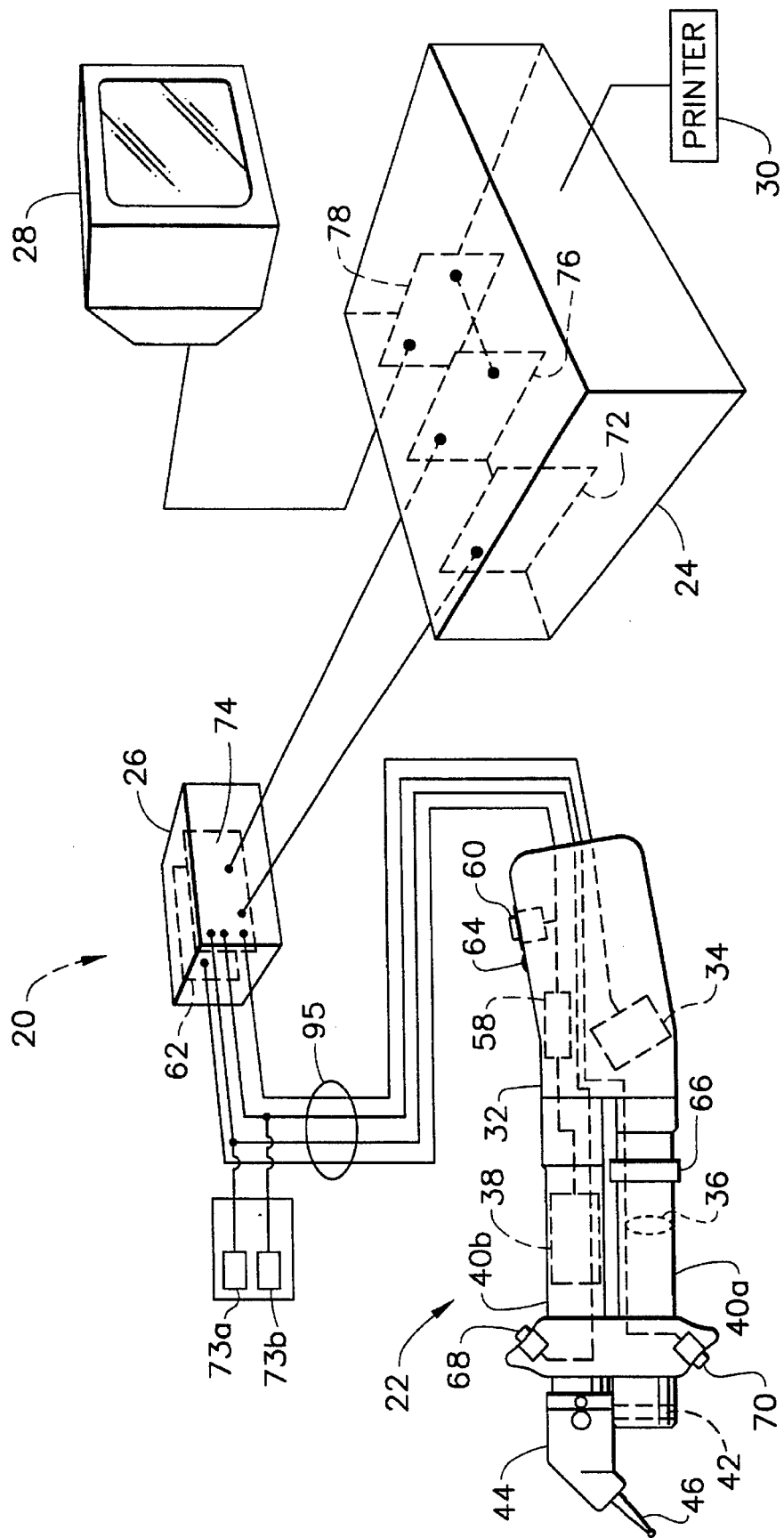
FIG. 1 is a schematic diagram of an apparatus for measuring the contour of a surface in accordance with the present invention.

Referring initially to FIG. 1, an apparatus 20 for measuring the contour of a surface includes a sensor, indicated generally by reference numeral 22, a computer 24, a sensor interface box 26 coupled between the sensor 22 and the computer 24, a display monitor 28 and a printer 30 for printing a hard copy of the information displayed on the monitor 28.

Figure 2:
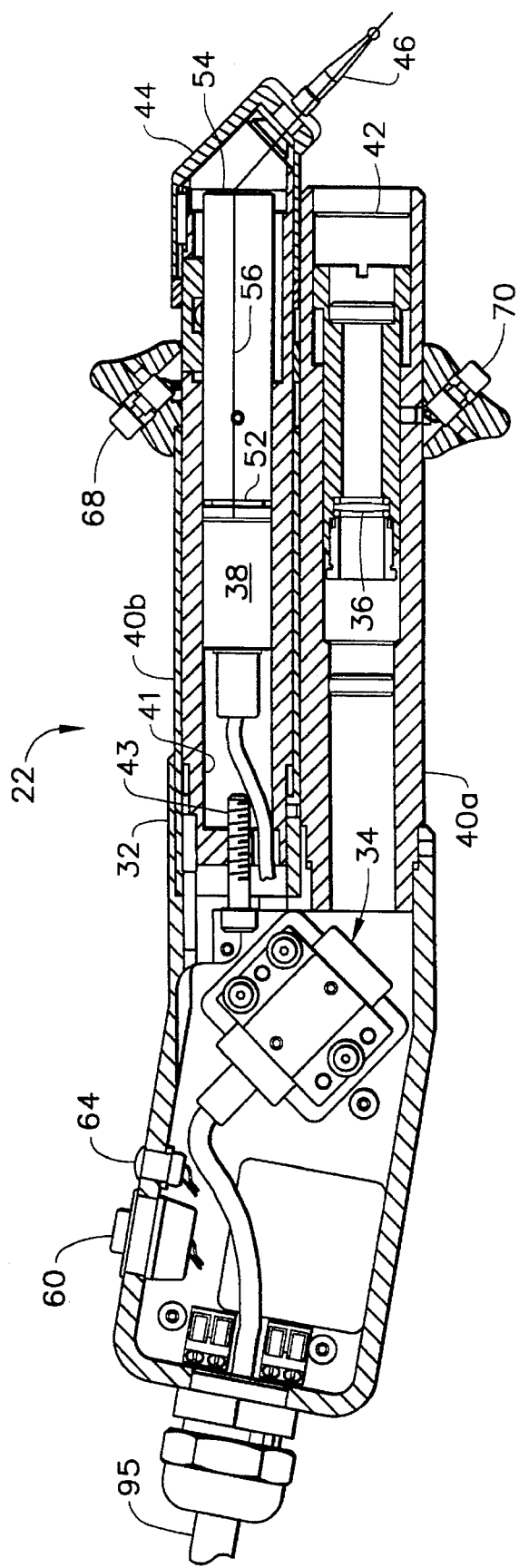
FIG. 2 is a detailed cross-sectional view of a hand-held sensor for use with the contour measuring apparatus of FIG. 1.

Referring also to FIG. 2, the sensor 22 includes a hand-holdable housing 32 in which is disposed an optical detector 34, such as a CCD camera or the like, imaging optics 36 and a high intensity light source 38, such as a laser line generator or the like, for generating a line of light 56. The optical detector 34 may be an ELMO® #EM-102 BW CCD camera. The sensor housing 32 includes two barrels or tubes 40a and 40b which are positioned parallel to one another. The imaging optics 36 are disposed in the tube or barrel 40a with the optical detector or camera 34 being disposed at one end of the tube 40a and the distal end of the tube 40a having a protective window 42 through which the image of a contour surface under inspection may be received by the camera 34.

The high intensity light source or laser line generator 38 is mounted within an inner laser support tube or barrel 41 which is slidably mounted for movement within the other barrel 40b. An adjustment screw 43 is threadedly attached in one end of the laser support tube 41 to provide positional adjustment of the support tube 41 within barrel 40b to permit positioning of the laser line generator 38 for positioning the laser light line 56 within the focal plane of the focusing lens 36 and the optical detector 34 or camera.

Figure 3:
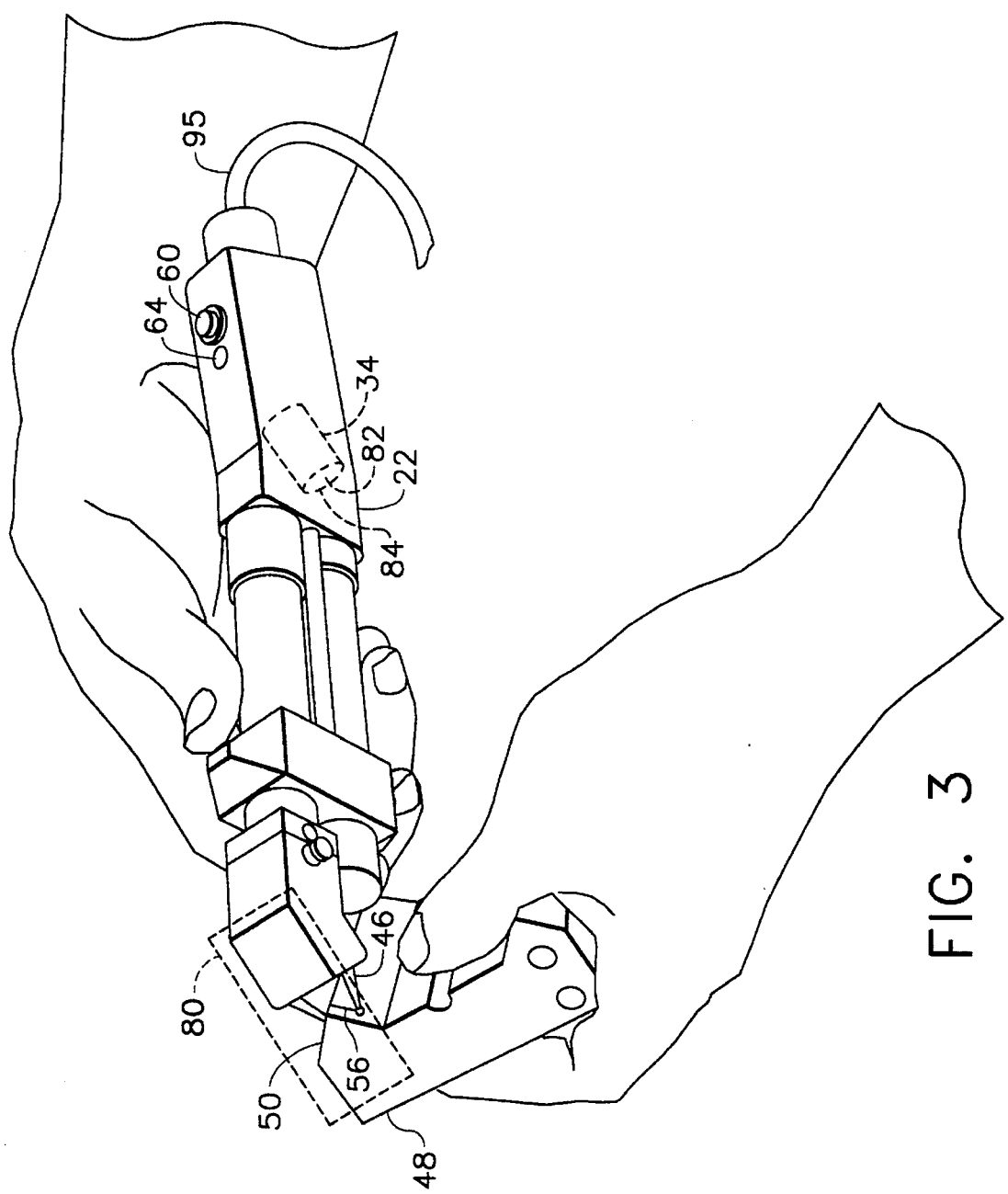
FIG. 3 is an illustration of the hand-holdable sensor of the present invention in position for measuring a contour feature of a component part.

A nosepiece 44 is attached to an outlet end of tube 40b and includes a pair of surface contact probes 46 for lightly contacting the surface of a component 48 without deforming or contaminating a contour feature 50 being measured, as best shown in FIG. 3. The contact probes 46 present the contour feature 50 to be measured, to the sensor 22 in the proper field of view (FOV) and alignment for the camera 34. The apparatus 20 is essentially non-contacting in that the contour feature 50 being measured is between the contact probes 46 and is not actually physically contacted by the sensor 22. The nosepiece 44 is detachable from the end of barrel 40b to permit attachment of different nosepieces depending upon the size and shape of the contour feature to be measured and the field of view desired or required to obtain a complete image of the contour feature 50.

The laser line generator 38 includes a cylindrical lens 52 positioned between a laser source (not independently shown) and a refracting lens 54 which is disposed in an end of the barrel 40b proximate to the nosepiece 44. The cylindrical lens 52 converts the laser beam generated by the laser source into a plane of laser light oriented parallel to the longitudinal extent of the barrel 40b and which appears as the line of laser light 56 looking directly down the barrel 40b. The refracting lens 54 bends the plane of laser light to project the line of laser light 56 onto the contour feature 50 of the component 48 at the proper angle with respect to camera 34 and imaging optics 36 to illuminate the contour feature 50. The line of laser light 56 (FIG. 3) is therefore projected onto the contour feature 50 to illuminate the feature for generation of an image of the feature by the camera 34.

The laser line generator 38 may be an Optima® #CDL-3500-006 or the like which includes other optical elements which function with a diode laser source (not shown) and cylindrical lens 52 to collimate, focus and fan the radiation from the diode laser to produce a very thin line of light with the desired proportions in the field of view of the camera 34 of the sensor 22. Other high intensity light sources with appropriate optical elements such as apertures and focusing lenses may be used as well to generate a well defined line of light 56 to illuminate the contour feature 50.

The laser line generator 38 is connected to a laser driver board 58 (FIG. 1) for supplying the proper input power to the laser 38. The laser driver board 58 is connected by a laser power switch 60 to a laser power supply 62 which is contained within the sensor interface box 26. The laser driver board 58 has an adjustable on-time timer function for setting the time period during which the laser line generator 38 will generate the laser light line 56 when the power switch 60 is operated for capturing an image of the contour feature 50 to be measured. The laser driver board 58 also includes an adjustable laser output intensity function or capability to permit selective adjustment of the laser beam intensity depending upon the operating conditions.

During operation of the laser line generator 38, a light emitting diode (LED) 64 mounted in the surface of the housing 32 will be illuminated to indicate to the operator that the laser line generator 38 is active.

The sensor 22 may also include a focusing knob 66 to permit adjustment of the imaging optics or focusing lens 36, or the position of the laser line generator 38 may be adjusted relative to the imaging optics 36 by adjustment of screw 43, as previously described, to provide proper magnification or to improve the quality of the image of the contour feature being measured. In some applications, it may be desirable to "fuzzy up" or defocus the contour feature 50, illuminated by the laser light line 56, to permit a pixel by pixel analysis of the image of the contour feature 50 to more particularly define the feature using image analysis software stored on the computer 24. This has the effect of filtering out high frequency noise components in an image of the contour feature 50. Those skilled in the art will notice, however, that image analysis software may be utilized in any situation or at any time and such use is not restricted to a defocused image as just described.

The sensor 22 further includes a pair of control switches 68 and 70; one control switch, switch 68, is preferably mounted on the top of housing 32 in a position for operation by an operator's thumb, as best shown in FIG. 3, to permit scrolling through a menu displayed on the monitor 28 of different operational functions or measurements which may be performed by the apparatus 20. The other switch, switch 70, is preferably mounted in a lower portion of the housing 32 in a position (FIGS. 2 and 3) for operation by the index finger of an operator to permit selection of an option or function within a menu as described in more detail herein below. While the switches 68 and 70 have been described as performing particular functions, each of the switches 68 and 70 could equally be reversed. The switches 68 and 70 also facilitate the use of the apparatus 20 and speed up the measurement process by avoiding the need for a keyboard to perform common, repetitive operations. The switches 68 and 70 are connected by the sensor interface box 26 to an input/output interface board 72, such as a Contec® I/O 16/16T interface board or the like, disposed in computer 24 which permits scrolling through the menus and selection of the menu options displayed on the monitor 28. A pair of foot switches 73a and 73b may also be provided, connected in parallel with switches 68 and 70 to perform the same functions.

The camera 34 is coupled to a camera imager 74 located in sensor interface box 26, and the camera imager 74 is in turn connected to a frame grabber board 76 located in computer 24. The frame grabber board 76 may be a DT 2851 frame grabber board as manufactured by Data Translation, Inc., or the like. The camera imager 74 receives the physical images from camera 34 and converts these images to national television standard (NTS) signals for receipt by the frame grabber board 76. The frame grabber board 76 is connected to a video multimedia board 78 in the computer 24 which facilitates displaying the image of the surface contour 50 received by the camera 34 on the monitor 28 and permits the simultaneous display of the operational menu or menus and also permits display of the results of the measurement calculations as will be described in more detail hereinafter. The video multimedia board 78 may be an SVW-ISO as manufactured by New Media Graphics, Inc.

Figure 4A:
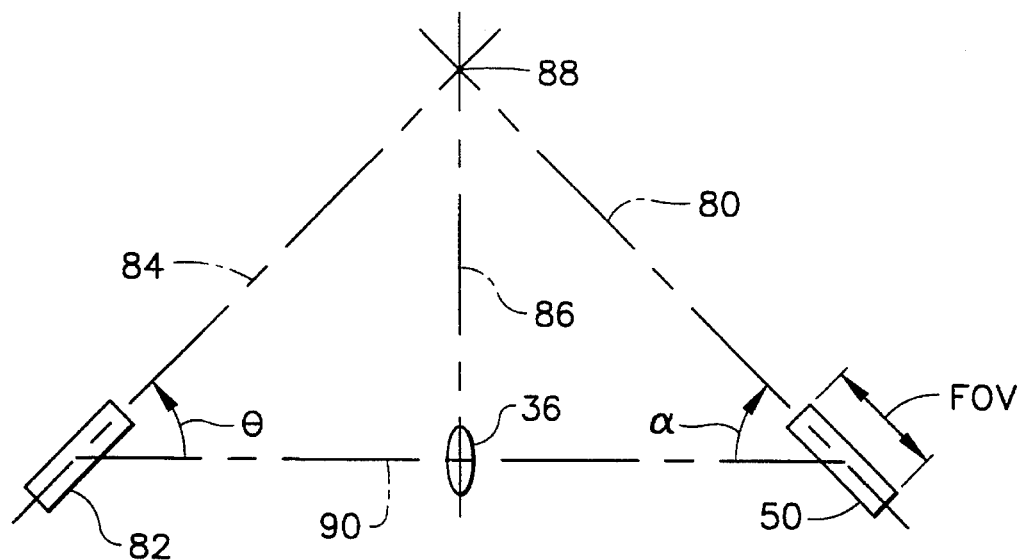
FIGS. 4A, 4B and 4C illustrate different optical alignments between the surface contour feature being measured, the focusing lens and the camera of the sensor according to the size of the field of view of the contour being measured.
Figure 4B:
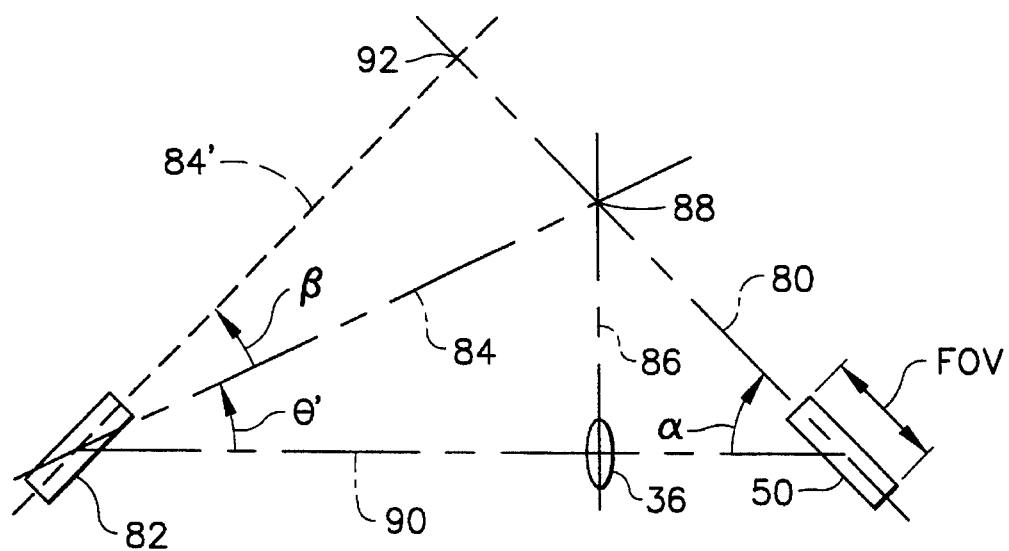
Figure 4C:
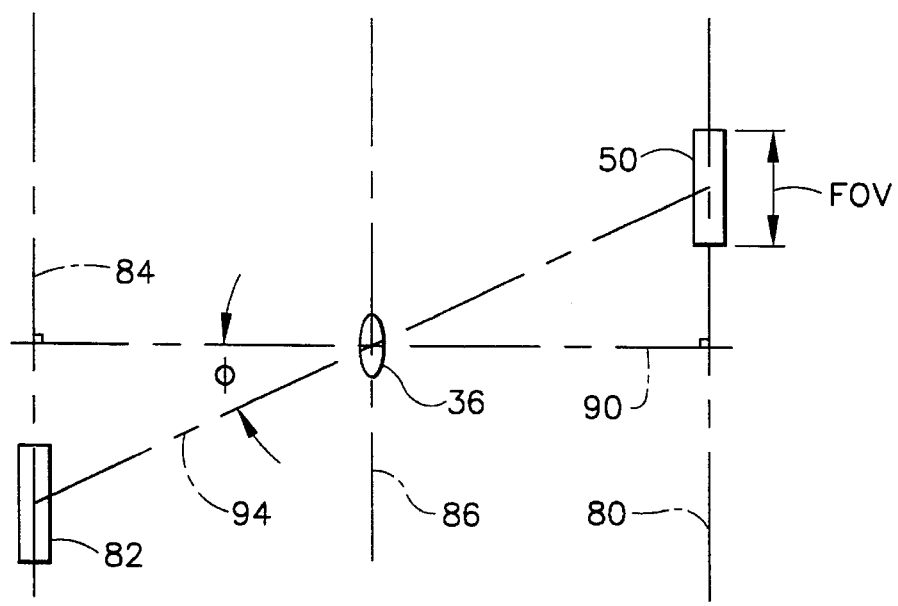

Referring to FIG. 3, a measurement is performed by presenting the component part 48 to the sensor 22 by placing the sensor contact probes 46 in contact with the component part 48 at the location of the selected surface contour feature 50 which is to be measured. The line of laser light 56 will then be projected onto the component part surface to illuminate the selected contour feature 50 when the laser 38 is activated by operating laser power switch 60. The line of laser light 56 will intersect the surface of the component part 48 in a first plane or object plane 80, as best illustrated in FIGS. 4A, 4B and 4C which illustrate the relationship between the contour feature 50 being measured and the imaging or focusing lens 36 and the face or photosensitive surface 82 of the camera 34 which lies in or defines an image plane 84. As shown in FIG. 4A, the lens 36 is positioned such that an optical plane 86 of the lens 36, the object plane 80 and the image plane 84 intersect in a line 88. This optical arrangement is known as the "Scheimpflug Condition" which is described in more detail in U.S. Pat. No. 5,090,811 issued Feb. 25, 1992, entitled "Optical Radius Gage", by Charles W. Donaldson, which is assigned to the same assignee as the present invention and is incorporated herein in its entirety by reference. When the Scheimpflug Condition is met, the image within the field of view (FOV) will be projected or imaged off-axis onto the photosensitive surface 82 of the camera 34 which will receive an in-focus image of the contour feature 50 across the entire FOV. The image is considered to be projected or imaged off-axis onto the photosensitive surface 82 because the surface 82 is not normal or perpendicular to the direction of light being received by the camera of the image but rather is oriented at some angle $\theta$. Under the Scheimpflug Condition, once the angle $\alpha$ between the principal axis 90 of the lens 36 and the direction of the laser line or the object plane 80 is set, the angle $\theta$ between the principal axis 90 of the lens 36 and the image plane 84 will be determined to satisfy the Scheimpflug Condition.

Referring to FIG. 4B, when measuring smaller features, such as features having a field of view as small as about 1/16" or smaller, the focusing lens 36 may be moved closer to the contour feature 50 within sensor tube 40a to provide the desired magnification and to project the entire field of view onto the photosensitive surface 82 of the camera 34. To satisfy the Scheimpflug Condition under this optical arrangement would require that the angle $\theta$ between the principal axis 90 of the lens 36 and the image plane 84 be at such an acute angle 8' that light reflected from the contour feature 50 will be reflected off the face of the camera and will not be received by the photosensitive array 82, if standard commercially available lenses and cameras are used. Therefore, it is necessary to increase the angle of inclination of the image plane 84 by a selected angle $\beta$ to a new image plane 84' where the light from the contour feature 50 will not be predominantly reflected off the camera face. The new image plane 84' and the object plane 80 will intersect in a different line 92 than the line of intersection 88 of the optical plane 86 of lens 36 and the object plane 80. For fields of view of about 1/16th of an inch, the sum of angles α' and β may be about 24° to provide an image which is minimally distorted or out of focus and if desired could be corrected by known software in computer 24.

Alternatively, the planar triangulation optical arrangement disclosed in U.S. Pat. No. 5,090,811 may also be used with the present invention. Referring to FIG. 4C, briefly described, this optical arrangement is defined by the object plane 80, optical plane 86 of the lens 36 and the image plane 84 of the photosensitive surface 82 of the camera 34 all being parallel to one another. A secondary axis or plane 94 passes through lens 36 at an angle φ relative to lens principal axis 90 and intersects the object plane 80 and the image plane 84 disposed on opposite sides of the lens 36. As described in U.S. Pat. No. 5,090,811, this optical arrangement will also provide an in-focus image of the contour feature 50 within the field of view of the camera 34 on the photosensitive surface 82 of the camera.

Different sensors 22 may be provided which correspond to different ranges of sizes of FOV desired. Each sensor 22 would have a different pre-set optical arrangement corresponding to the arrangements illustrated in FIGS. 4A–4C according to the range of the expected FOV. Selected electrical pins (not shown) associated with the umbilical cord 95 interconnecting the sensor 22 to the sensor interface box 26 may be shorted in a predetermined pattern to identify to the computer 24 which type of sensor 22 is connected to the apparatus 20.

Figure 5:
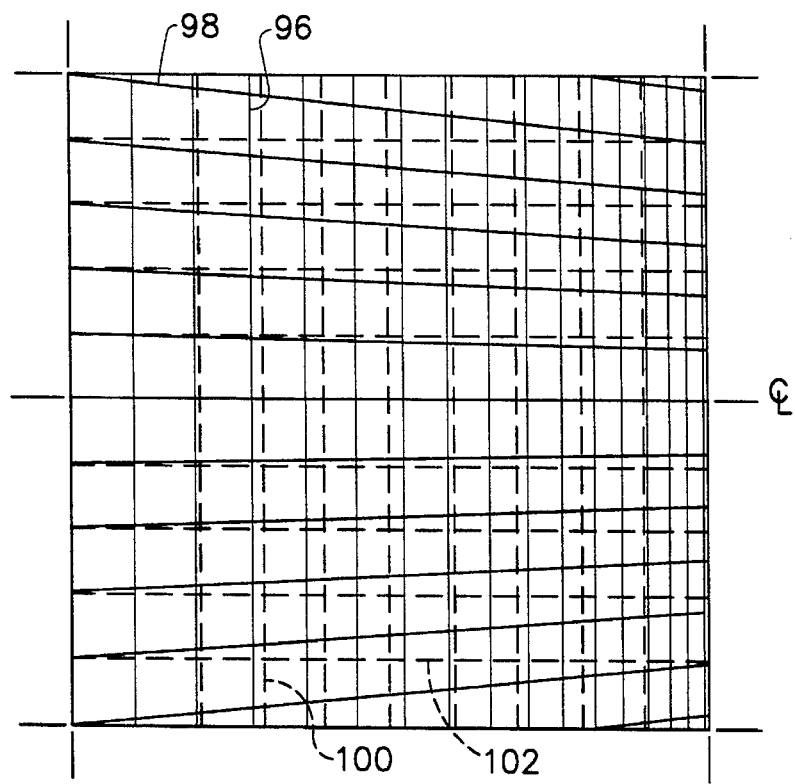
FIG. 5 is an illustration of an image of a square grid for use in calibrating the apparatus of FIG. 1 in accordance with the present invention.

With the "near-Scheimpflug Condition" illustrated in FIG. 4B, the image received by the photosensitive surface 82 and generated by the camera 34 will include a keystone effect and a distortion effect caused by the relative positioning of the optical components and the object 50 to be imaged. To illustrate, if the object being imaged is a uniform, square grid, the image will look like the solid vertical and horizontal gridlines 96 and 98 in FIG. 5. The horizontal lines 98 will appear to converge on one side of the image and to diverge on the opposite side, and the vertical lines 96 will appear to be spaced increasingly closer together on the one side of the image where the horizontal lines 98 appear to converge and will be spaced increasingly further apart on the other side of the image where the horizontal lines appear to diverge.

In accordance with the present invention, a calibration method or procedure is stored in computer 24 for correcting for the keystone and distortion effects. To correct or calibrate the apparatus 20 for the keystone and distortion effects, a uniform, square grid, referred to as a "Whipple Grid", is placed within the field of view of the sensor 22. Because of the keystone and distortion effects, the image received by the photosensitive surface 82 of the camera 34 and the image generated by the camera 34 and displayed on monitor 28 will appear like the solid vertical and horizontal gridlines 96 and 98 in FIG. 5 just described. A software calibration routine stored in computer 24 is entered which causes a uniform square grid to be electronically superimposed over the distorted gridlines 96 and 98. The uniform square grid is represented by vertical and horizontal broken gridlines 100 and 102 in FIG. 5 for purposes of clarity and explanation; however, if the monitor 28 is a color monitor, the uniform square gridlines 100 and 102 may be solid lines of a predetermined color to distinguish from the image of the distorted Whipple grid 96 and 98. The distorted image (gridlines 96 and 98) of the uniform square Whipple grid presented within the field of view of the sensor 22 would be identical to the electronically generated uniform square gridlines 100 and 102, if the image were not distorted and skewed by the keystone and distortion effects. After the square Whipple grid is properly positioned and oriented in the FOV of the sensor 22, the uniform square gridlines 100 and 102 are repetitively, electronically adjusted or moved by the operator using the switches 68 and 70 or a keyboard (not shown) of the computer 24 to make gridline movement selections from a menu as the operator observes the superimposed image. The gridlines 100 and 102, are adjusted until they are identically matched to the other gridlines 96 and 98 to perform a coordinate transformation based on the movement of the gridlines. The distances and angles by which each of the gridlines 100 and 102 are moved define different parameters (vertical and horizontal grid convergence adjustment parameters and vertical and horizontal grid spacing adjustment parameters) which are stored in the computer 24 for use in performing an automatic coordinate transformation of the image data received during the measurement of a contour feature 50 when using the near-Scheimpflug optical arrangement in FIG. 4B. The success of the calibration routine may be verified by measuring gage pins of a known radius or other certification artifacts having a known contour feature.

Figure 6A:
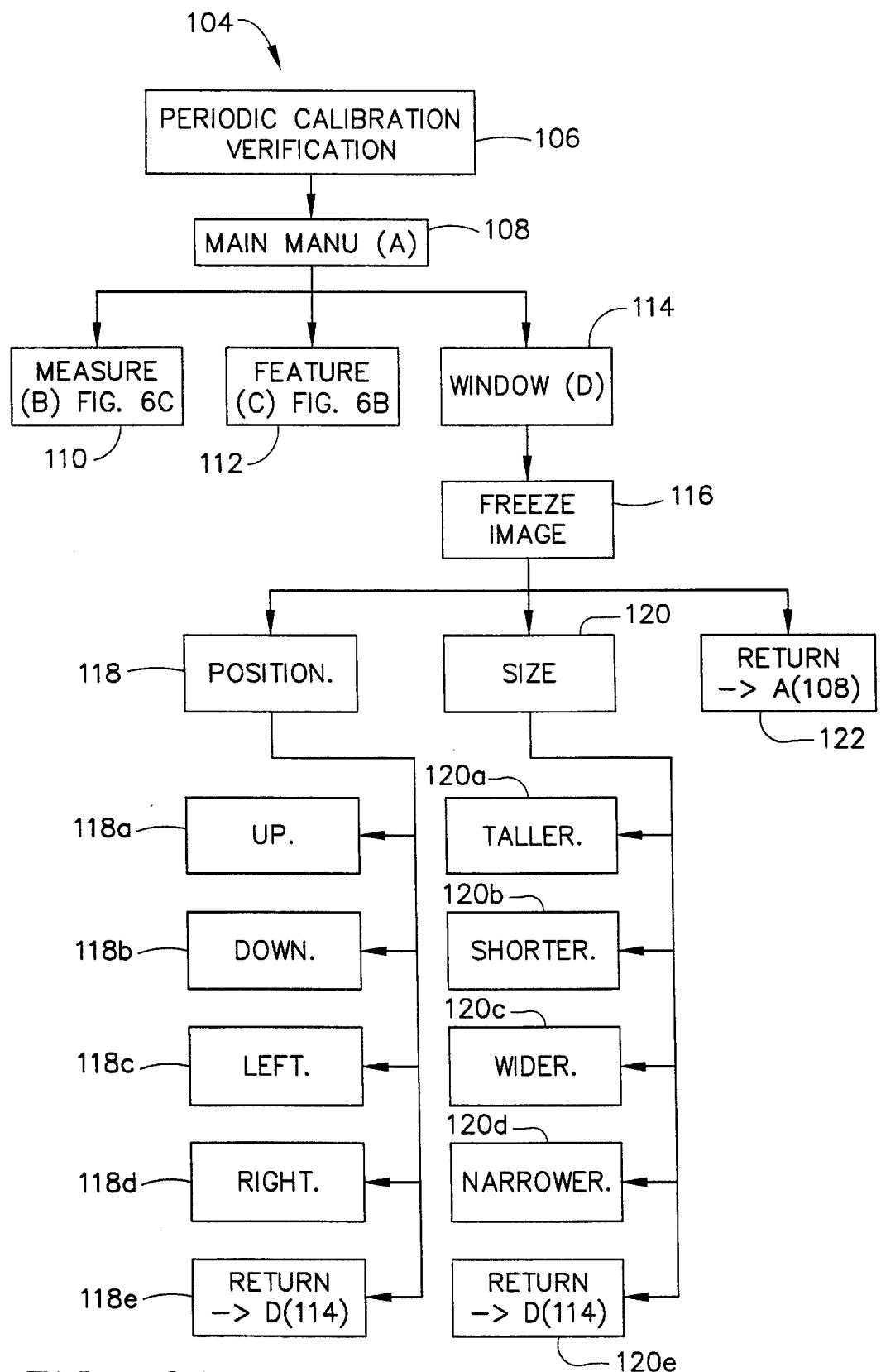
FIGS. 6A, 6B and 6C are an example of a system software tree diagram or flow chart with displayable menu features for use with the apparatus of the present invention.

In accordance with the present invention, when the computer 24, sensor interface box 26 and monitor 28 of the apparatus 20 are energized, a menu or menus of operational functions or features for performing contour measurements are displayed on the monitor 28. As previously described, switch 68 on sensor 22 may be used to scroll through the menu or menus and switch 70 on the sensor 22 may be used to select a particular function or feature within a particular menu. A menu (illustrated generally by reference numeral 104 in FIGS. 6A–6C) for use with the apparatus 20 of the present invention is illustrated in flow graph form in FIGS. 6A–6C. Initially, a periodic calibration verification routine 106 may be performed whereby a gage pin of a known radius or curvature may be measured by the apparatus 20 or another appropriate certified artifact having contour features of known dimensions may be measured to verify that the apparatus 20 is properly calibrated for performing accurate measurements. The computer 24 may be programmed to require that the calibration verification 106 be performed at predetermined time intervals, i.e., every 24 hours, and the system 20 must successfully pass the verification before the computer software will allow normal measurements to be conducted.

After calibration verification 106, a "MAIN MENU" 108 may be entered which will provide three options, "MEASURE" 110, "FEATURE" 112 and "WINDOW" 114. The laser 38 (FIG. 1) may be energized by operating button 60 either before or after entering the "MAIN MENU" 108 to generate the line of laser light 56 (FIG. 3) for illuminating a selected contour feature on the surface of a part 48 for generating an off-axis image of the illuminated contour feature using the camera 34 as previously described.

The "WINDOW" feature 114 may be selected using buttons 68 and 70 on sensor 22, and the sensor 22 may be manipulated by hand relative to the component part 48, as shown in FIG. 3, to provide the desired image of the selected contour feature 50. When an acceptable image is visible on the monitor 28, a "FREEZE IMAGE" 116 menu option may be selected with button 70 to capture the image of the selected contour feature 50 illuminated by the line of laser light 56 (FIG. 3). The menu 104 then displays options on the monitor 28 that permit adjusting the "POSITION" 118 and "SIZE" 120 of a window outline displayed on the monitor for framing a portion of the image of the contour feature or features to permit homing in on the precise aspect of the contour feature desired to be measured. The position of the window may be moved up, down, left or right as illustrated by menu options 118*a*–*d* and the size of the window may be made taller, shorter, wider or narrower as illustrated by options 120*a*–*d*. After adjusting either the position or size of the window, the program may be returned to the "WINDOW" option 114 in the menu 104 by operating menu selection "RETURN→ D", 118*e* or 120*e*, to permit acquisition of another image if the first image does not show the desired contour feature to be measured or if a different part is to be measured. The "WINDOW" option 114 may be exited and the program returned to the "MAIN MENU" 108 by selection of the menu option "RETURN→A", block 122.

Once the "WINDOW" feature 114 has been adjusted to the desired position and size, or if the "WINDOW" feature 114 was not necessary or desired for the particular contour measurement to be performed, the "FEATURE (C)" option 112 under the "MAIN MENU" 108 may then be selected by button 70 to display the different types of contour features measurable by the apparatus 20 for selection of the specific contour feature which is to be measured.

Figure 6B:
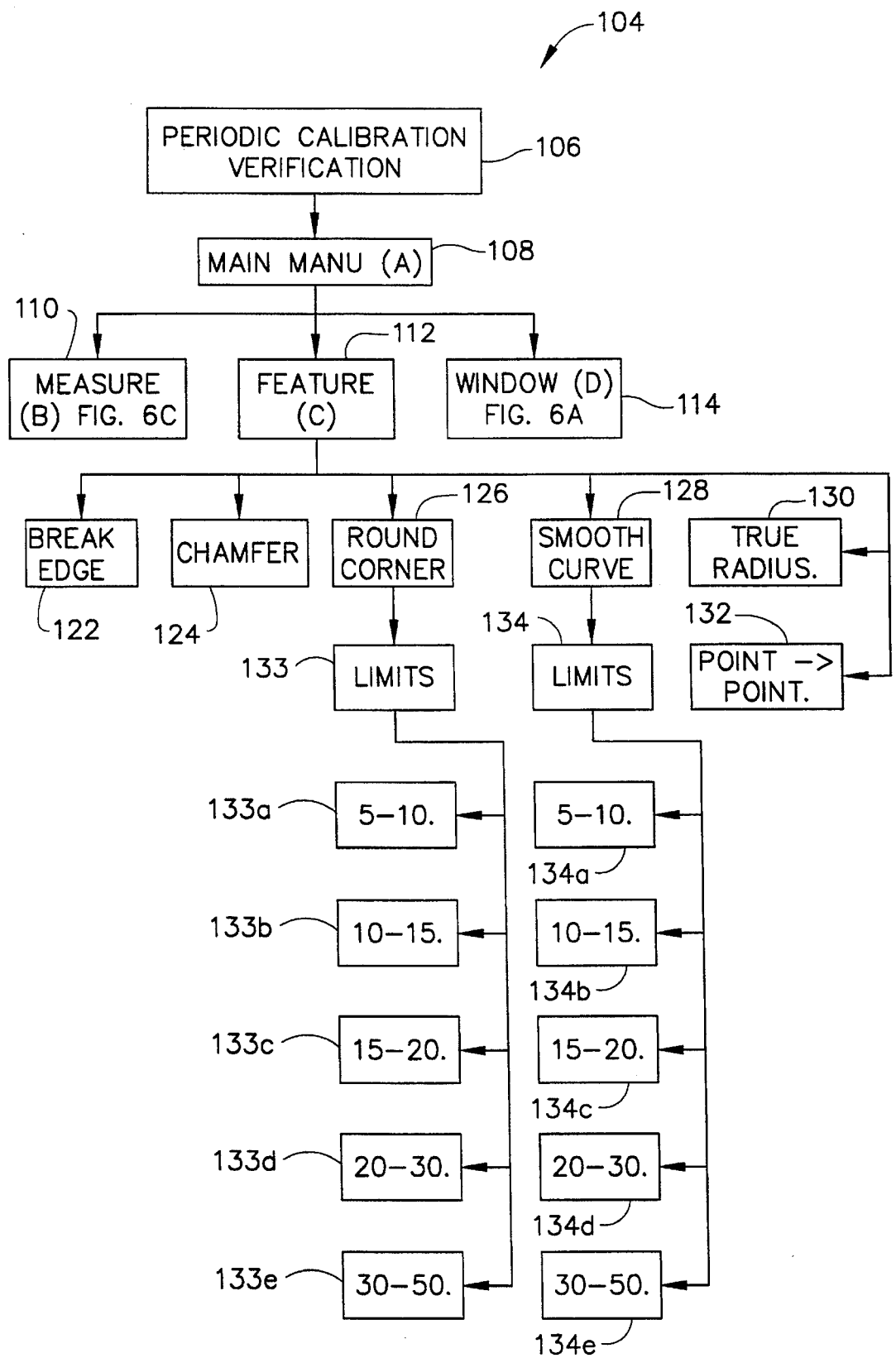

Referring to FIG. 6B, examples of menu options of different contour features which may be measured by the apparatus 20 of the present invention includes, but is not necessarily limited to, a "BREAK EDGE" 122, a "CHAMFER" 124, a "ROUND CORNER" 126, a "SMOOTH CURVE" 128, a "TRUE RADIUS" 130 and a "POINT-TO-POINT" 132 measurement between different points located on an image of a contour feature. The menu options of the different contour features may be scrolled through using button 68 and the particular feature to be measured may be selected by button 70 to preset the apparatus 20 to perform the selected contour measurement. The "ROUND CORNER" 126 and "SMOOTH CURVE" 128 measurements are virtually identical and if selected, the menu 104 will display limit options 133 and 134 which may be scrolled through using button 68. A particular range of limits 133*a*–*e* or 134*a*–*e* of the radius of the arc forming the round corner or the smooth curve may be selected by button 70 according to a range of limits within which the selected contour feature to be measured should fall, as specified in a drawing or specification of the part.

Figure 7A:
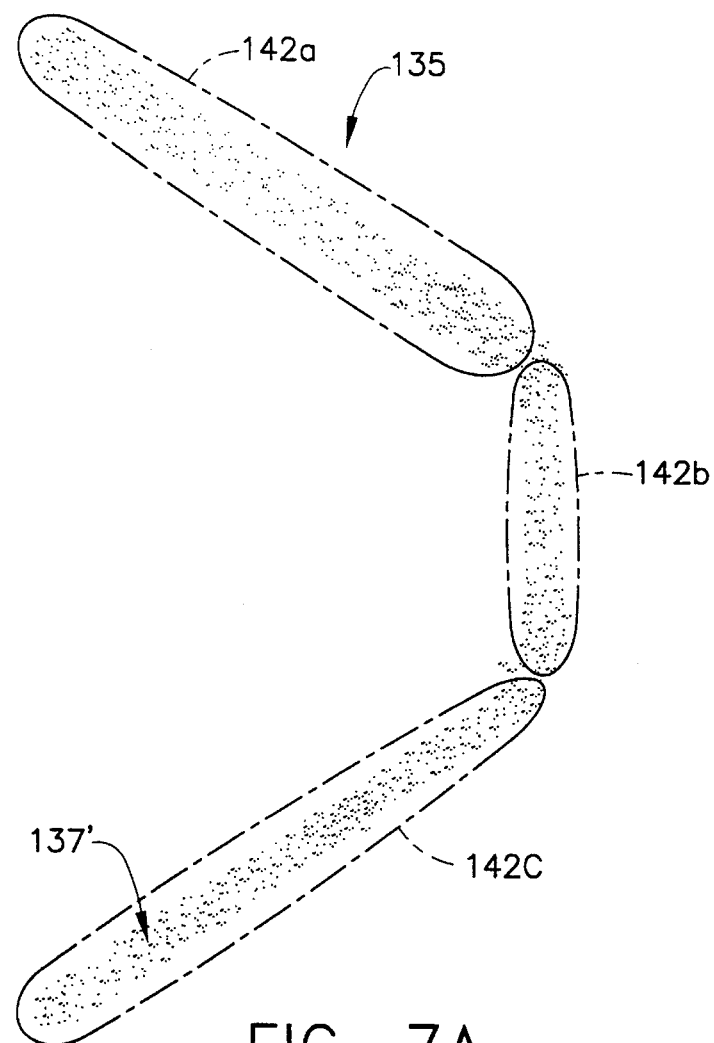
FIG. 7A is an illustration of an image of a contour feature, such as a chamfer or a break edge, captured by the apparatus of the present invention showing the cluster of raw gray level data points making up the image.
Figure 7B:
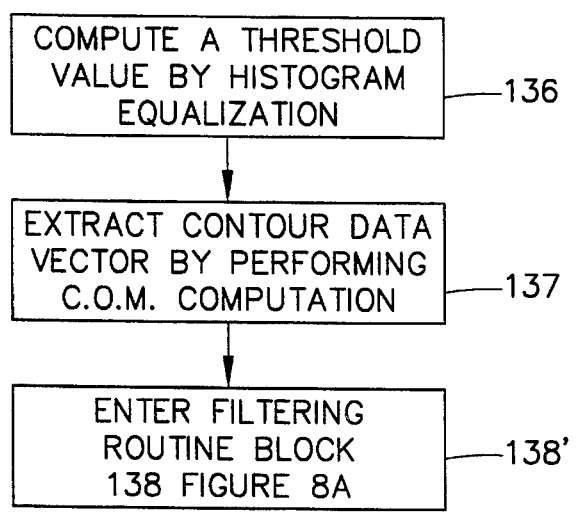
FIG. 7B is a flow graph illustrating a procedure for processing the image data points shown in FIG. 7A.

After capturing the image of the contour feature to be measured (block 116 in FIG. 6A), the computer 24 is programmed to automatically begin processing the raw gray level image data by a procedure which is generally referred to as "clustering and neighborhood processing per a schema" in knowledge-based image processing terminology. Referring to FIG. 7A, the raw image data of the contour feature will appear as a cluster of gray scale data points, indicated generally by reference numeral 135 in FIG. 7A. The image data of a break edge or chamfer is illustrated in FIG. 7A for purposes of explanation. Referring also to FIG. 7B, the "clustering and neighborhood processing per a schema" includes the step of computing a threshold gray level value from the image cluster 135 of raw data points by using histogram equalization (block 136) as described in the textbook by Rafael C. Gonzales and Paul Wintz, *Digital Image Processing, Second Edition,* 1987, pp. 146–153. After computing the threshold gray level value, the procedure includes the step of extracting a contour data vector, block 137, from the image by performing a center of mass (COM) computation on each raster of the image separately using only the data points in each raster bounded by the two data points nearest each extreme end of the raster whose gray level value exceeds the computed threshold value in step 136. The contour data vector 137' in FIG. 7A is then defined by one data point in each raster of the image 135 which represents the center of mass location of the raw image data for each raster.

Referring back to FIGS. 6A–6C, after the contour feature to be measured has been selected under the "FEATURE" option 112 (FIG. 6B), presetting the apparatus 20 to perform the selected measurement, and the image of the contour feature has been captured and the contour data vector 137' extracted from the raw image data, the "MEASURE" feature 110 (FIG. 6C) may be scrolled to under the "MAIN MENU" 108 by button 68 and selected by button 70 to begin a measurement program stored in the computer 24. The measure program will enter a filtering routine, block 138, illustrated in flow graph form in FIGS. 8A and 8B, to determine if the image data obtained is satisfactory (decision block 139 in FIG. 6C) to perform an accurate measurement of the contour feature. A block 138', "ENTER FILTERING ROUTINE" is also shown in FIG. 7B to illustrate that the filtering routine may be considered a continuation of the "clustering and neighborhood processing per a schema".

Figure 8A:
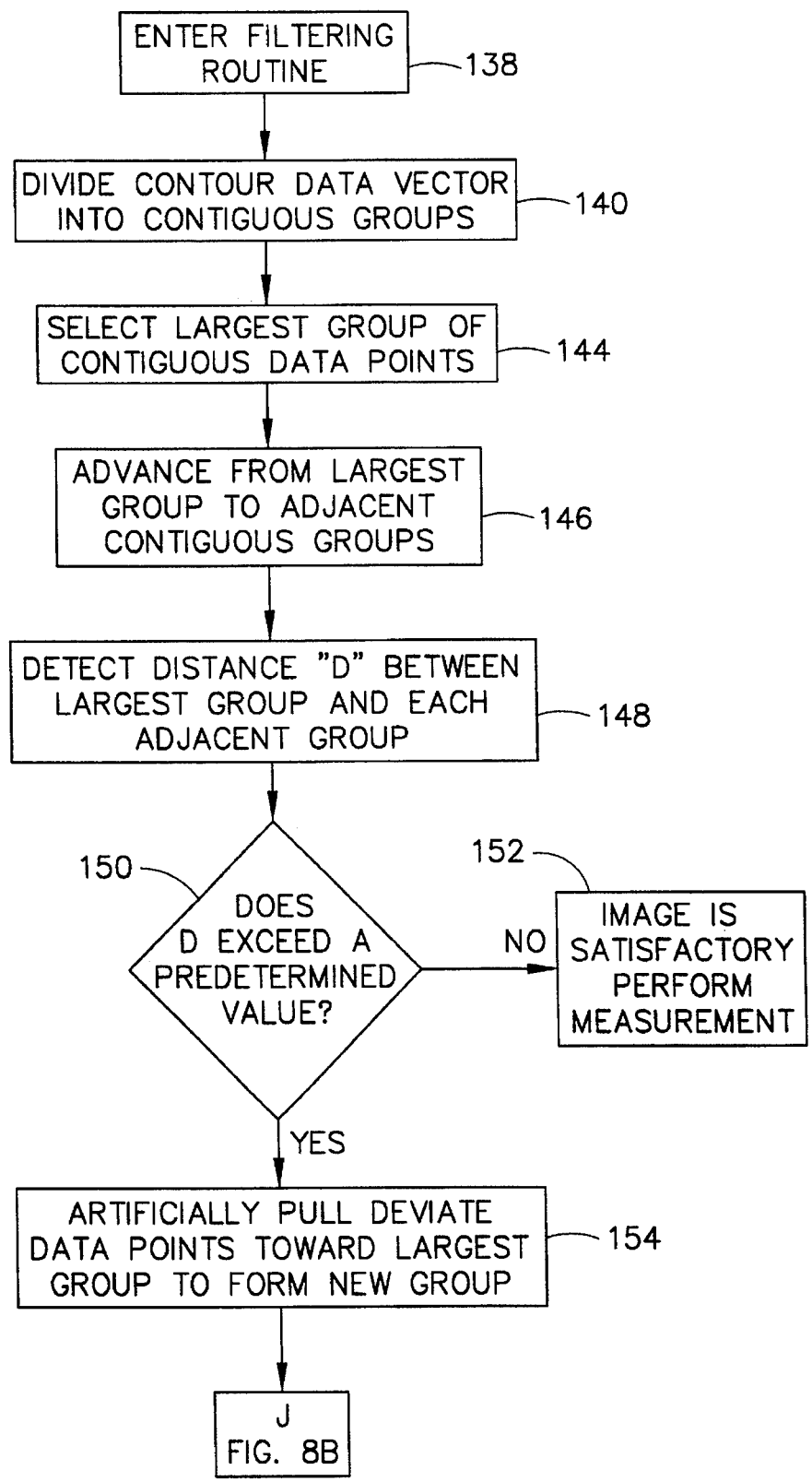
FIGS. 8A and 8B are a flow graph illustrating a method for filtering the image data received by the sensor of the present invention.

The filtering routine 138 includes an initial step, represented by block 140 in FIG. 8A, of dividing the contour data vector into contiguous groups (enclosed within chain lines 142*a, b* and *c* in FIG. 7A) based upon a predetermined data point-to-data point spacing. The filtering routine 138 then selects the largest group of contiguous data points as indicated by block 144 and from the largest group the routine advances to the next adjacent contiguous data group, block 146, to detect the distance "D" between the largest group and each adjacent group, block 148. In block 150, the distance D is compared to a predetermined value and if D does not exceed the predetermined value, the image is considered satisfactory to perform the measurement, block 152. If distance D exceeds the predetermined value, the deviate data points are artificially pulled toward the largest group to within a predetermined distance to form a new group, block 154. In the next step, block 156, another raster by raster center of mass calculation is performed on the image to provide a revised contour data vector, and in block 158 the filtering routine moves in a logical direction of the remaining data points to locate points with a gray scale intensity which exceed the threshold value computed by histogram equalization in block 136 of FIG. 7B. If the position of the next data point deviates from the logical progression by more than a predetermined amount in block 160, the data point is not included in the contour data vector in block 162. If a predetermined number of points deviate from the logical progression in block 164, the image is not satisfactory to perform a measurement and the program is returned to the "MAIN MENU (A)" (block 108), as indicated in block 166 in FIG. 8B and 6C. If the position of the next data point does not deviate from the logical progression of data points by more than the predetermined amount in block 160, the gray scale intensity on both sides of the data point in the raster are checked in block 168 to home in on the precise location of the image data point for use in the measurement. That point is then included in the contour data vector in block 170. After a center of mass has been calculated for all rasters containing image data points in block 172, the image is determined to be satisfactory and the measurement is performed in block 174 in FIG. 8B which also corresponds to block 174 in FIG. 6C. The predetermined values used in the filtering routine may be established empirically by initially selecting low threshold values and then increasing or tightening the requirements accordingly if a more defined image or greater measurement accuracy is desired or required.

Figure 9A:
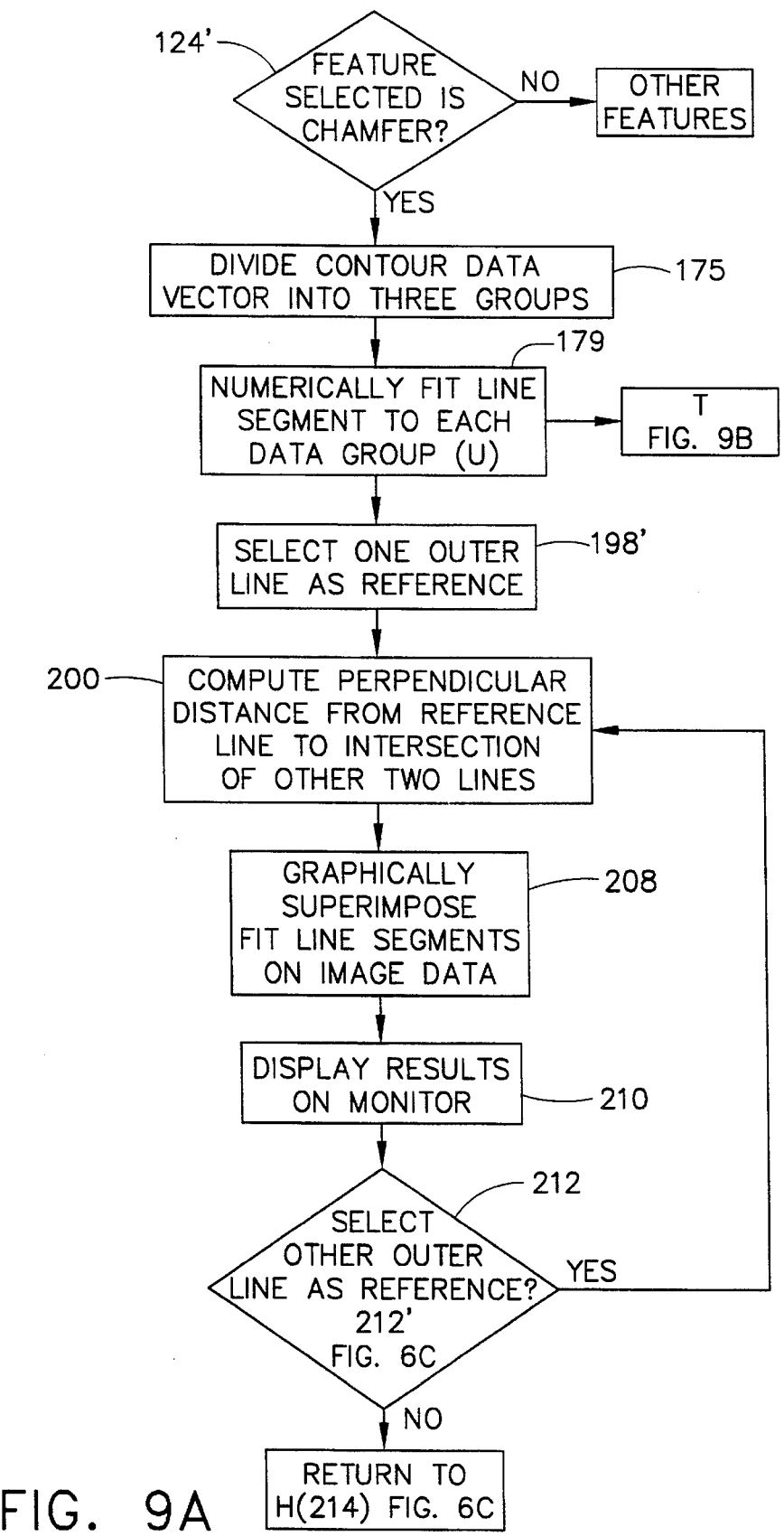
FIGS. 9A–9C are a flow graph illustrating a method for measuring a chamfer contour feature.
Figure 9B:
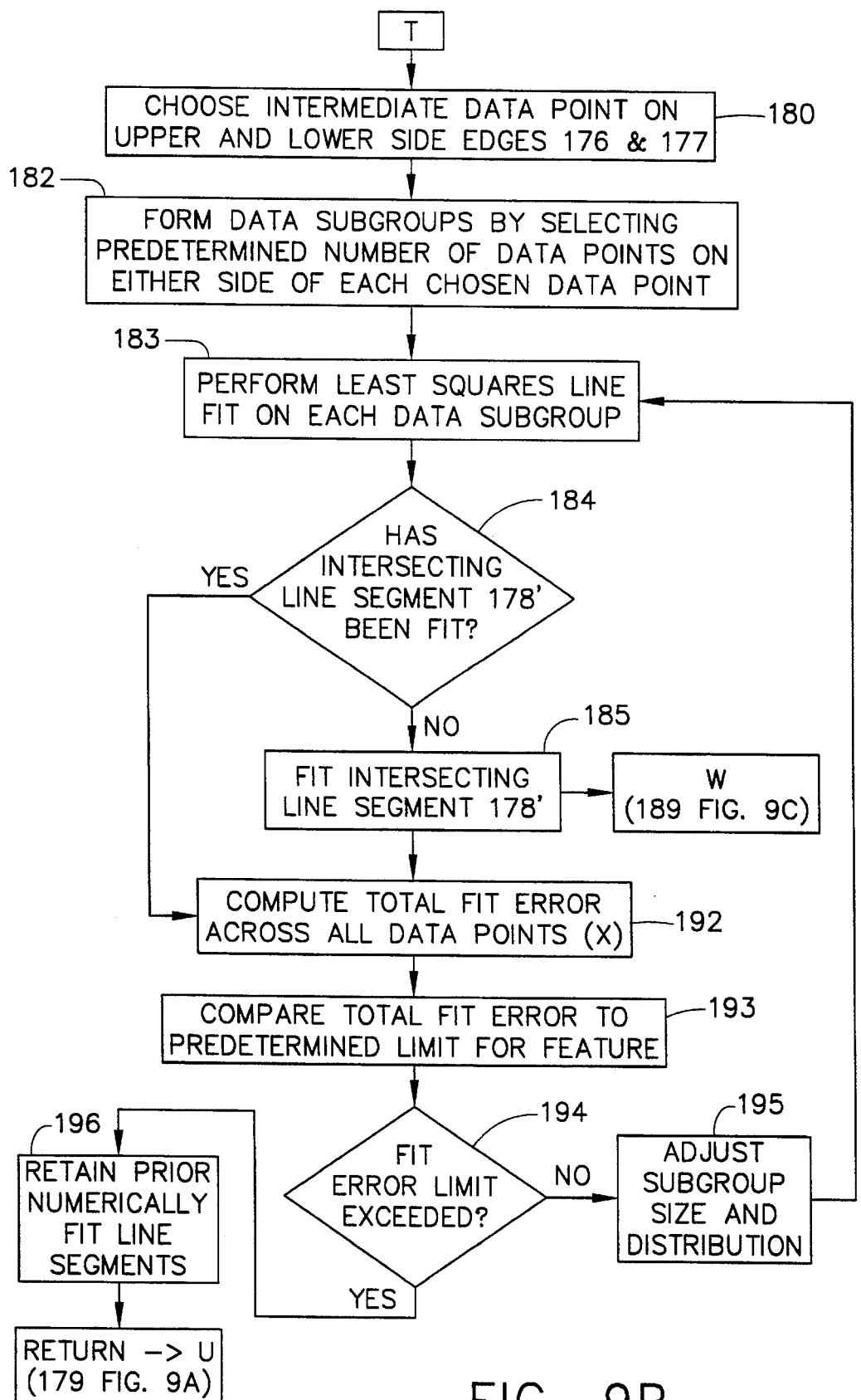

Referring back to FIG. 6C, if the image is satisfactory, the measurement, block 174, is performed according to the feature selected from the menu under block 112 ("FEATURE") in FIG. 6B. If a chamfer, block 124 in FIG. 6B, was selected (block 124' in FIGS. 6C and 9A), the chamfer may be measured according to the flow graph illustrated in FIGS. 9A-9C. The first step in the chamfer measurement is to divide the contour data vector 137' from the clustering and neighborhood processing of the raw image data 135 into three ordered and unique data groups, block 175, which correspond to the three contour portions forming the chamfer, i.e., the upper and lower side edges (enclosed in chain lines 176 and 177 respectively in FIG. 10) and the straight intersecting chamfer line segment (enclosed by chain line 178) intersecting the two side edges 176 and 177. A line segment 176', 177' and 178' is then numerically fit to each data group 176, 177 and 178 as indicated by block 179 in FIG. 9A and as shown in FIG. 10.

Numerically fitting a line segment to each data group 176, 177 and 178 may be accomplished by performing a residual least squares analysis of the data points within each data group 176, 177 and 178 or by some other known curve fitting routine. An example of a method for performing a least squares residual fit analysis on the image data groups is represented in flow graph form in FIG. 9B. For the upper and lower side edge line segments 176' and 177', an intermediate data point is chosen at a predetermined distance from the end of each data group 176 and 177, block 180, to avoid any noise or distortion in the captured image, which may be present proximate to the end of the data group 176 or 177. A selected number of data points are then taken on either side of each chosen data point to form a data subgroup, block 182, and a least squares fit is performed on each selected subgroup of data points, block 183.

Figure 9C:
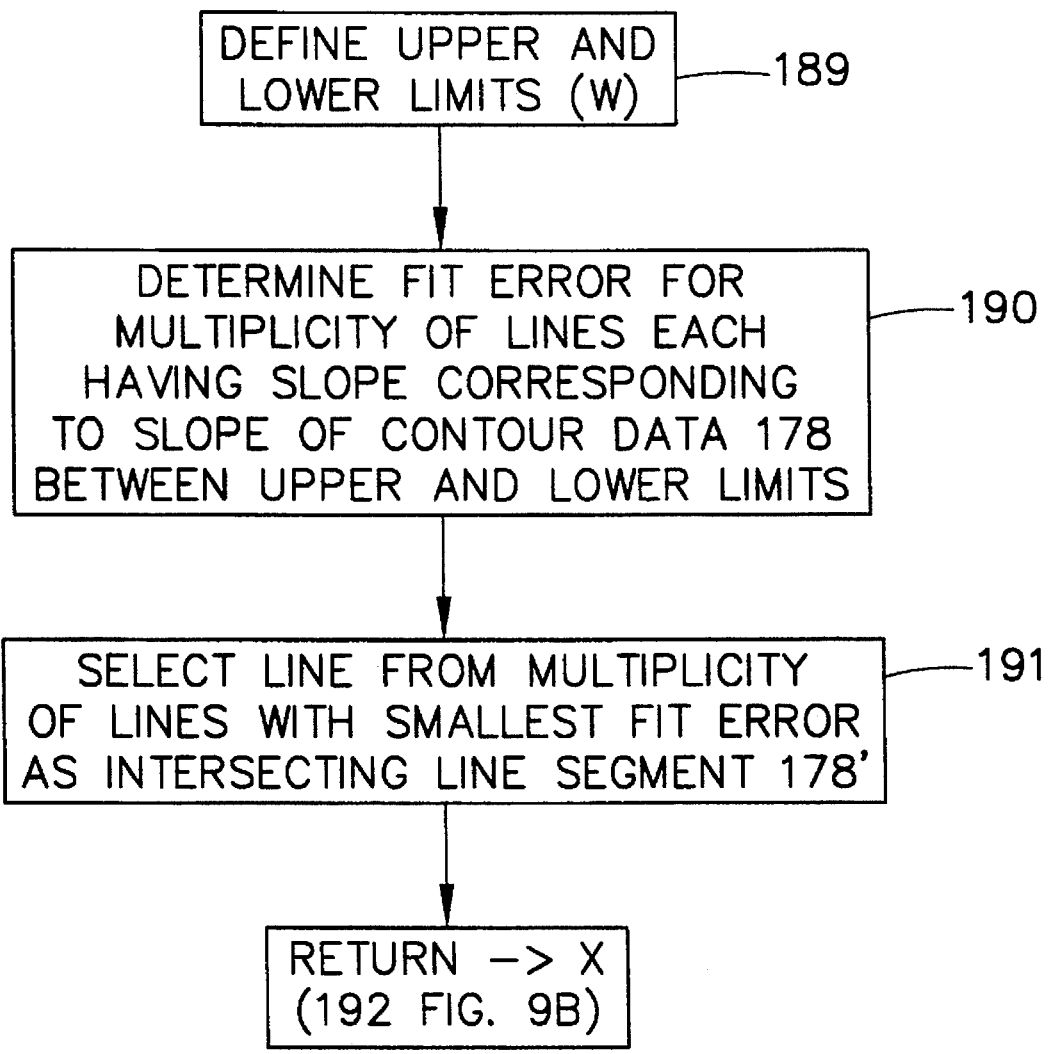
Figure 10:
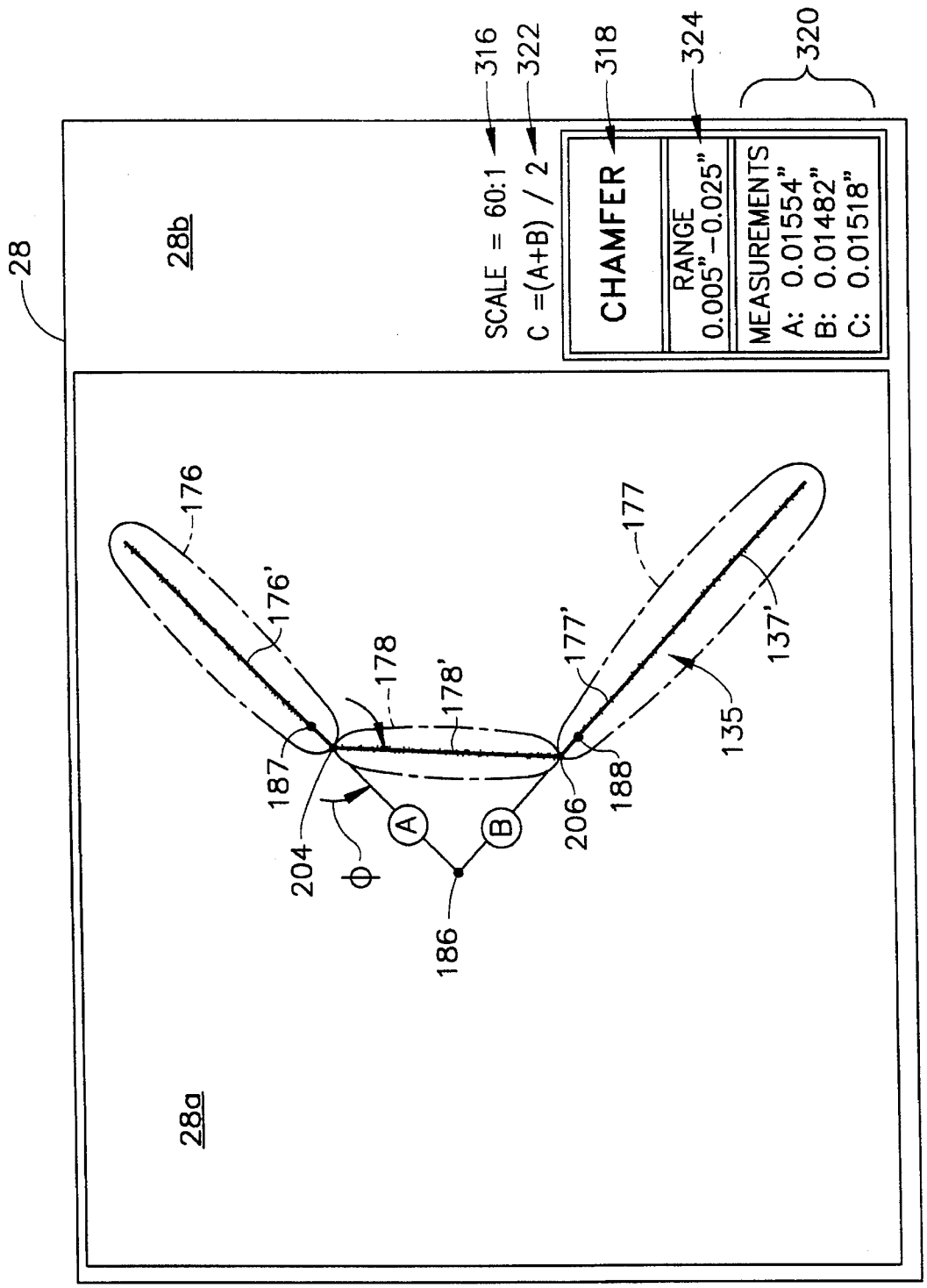
FIG. 10 is an illustration of the display of the apparatus of FIG. 1 showing the results of a chamfer measurement in accordance with the present invention.

If the intersecting chamfer line segment 178' has not been fit, the program will proceed from decision block 184 to block 185 and the intersecting chamfer line segment 178' may be fit to the contour data vector 137' of the image data 135 enclosed in chain line 178 by a method such as that illustrated in the flow graph shown in FIG. 9C beginning at "W", block 189. The method includes the step of defining an upper limit 186 and first and second lower limits 187 and 188 as shown on the image in FIG. 10. The upper limit 186 corresponds to a point where the upper and lower side edges 176' and 177' would intersect if extended. The first lower limit 187 is determined by moving a predetermined number of data points upwardly along the upper or top side edge group 176 of image data points from the lowest data point in the upper group 176. This moves the first lower limit 187 away from the intersection point of the upper side edge contour image data 176 and the intersecting line image data 178 which may be surrounded by noise or distortion in the image. The second lower limit 188 for the intersecting line segment 177' is also determined by moving a predetermined number of data points downwardly along the lower or bottom side edge group 177 of data points away from the highest data point in the lower side edge group 177 of contour data of the image. This moves the second lower limit 188 away from the intersection point of the lower side edge image data 177 and the intersecting line image data 178 to avoid any noise or distortion in the image at the intersection. A fit error, block 190 in FIG. 9C, is then determined for a multiplicity of different lines having a slope corresponding to the slope of the contour data 178 between the upper limit 186 and the lower limits 187 and 188. The line with the smallest fit error relative to the contour image data group 178 is selected for the intersecting line segment 178', block 191.

After fitting a line segment 178' to the intersecting line image data 178, the program returns to "X", block 192, in FIG. 9B, where a total fit error across all data points is calculated by calculating a fit error for each of the selected data points in each subgroup of the upper and lower side edges 176 and 177 and by summing these fit errors with the fit error for the intersecting line segment 178' to provide a total fit error across all data points. The total fit error is compared to a predetermined limit for the particular feature being measured, in this case a chamfer, in block 193 and if the fit error limit is exceeded in block 194 the size and distribution of each data subgroup for the side edges 176 and 177 is grown by adding a selected number of data points on either side of the previously selected subgroup of data points in block 195. The program then returns to block 183 where a new line segment is numerically fit to each new data subgroup. If the intersecting line segment 178' was previously fit, the program proceeds to block 192 where a new fit error is calculated for each of the new line segments and a new total fit error is computed across all of the data points in each new subgroup and the intersecting line segment 178'. This new total fit error is compared to the predetermined limit for the chamfer feature in block 193. This continuous revision of the data subgroups for the side edges 176 and 177 and fitting of line segments to each new data subgroup will continue until the total fit error exceeds the predetermined limit in block 194 which indicates that data was brought into the data subgroups which should not be part of the data used to form the numerically fit line segments. Therefore, the prior numerically fit line segments are retained in block 196 for performing the chamfer measurement.

Referring back to FIG. 6C, in the chamfer measurement, the menu 104 will display a "REFERENCE" choice, block 198, to select as a reference either the top side edge line segment 176' (block 198a in FIG. 6C) or the bottom side edge line segment 177' (block 198b in FIG. 6C). This selection of the reference also corresponds to block 198' in FIG. 9A. After selecting one of the outer lines 176' or 177' as a reference, the perpendicular distance from the selected reference line to the intersection of the other outer or side edge line with the intersecting chamfer line 178' (FIG. 10) is calculated, block 200. To describe more fully, referring to FIG. 10, if top line 176' is selected as the reference then the perpendicular distance "B" from an extension "A" of the top line 176' (point 186) to the intersection of chamfer line 178' and the bottom outer line 177' (point 206) is determined and the distance of the extension "A" is calculated. Alternatively, the bottom outer line 177' may be selected as the reference and the program will calculate the perpendicular distance from an extension of the bottom outer line 177' to point 204 where the chamfer line 178' intersects the top line 176'.

In block 208 of FIG. 9A, the numerically fit line segments 176', 177' and 178' are graphically superimposed on the image data and displayed on the monitor 28 as illustrated in FIG. 10. Also displayable on the monitor 28, as illustrated in FIG. 10, will be the scale 316 of the image, the selected feature measured 318, the lengths 320 of the line segments "A", "B" and "C" wherein "C" is defined by equation 322 in FIG. 10, C=(A+B)/2, and also displayable is the range 324 of distances within which the apparatus 20 is capable of accurately measuring the selected contour feature type (for example the measurement range shown in FIG. 10 is 0.005"–0.025"). FIG. 10 illustrates how the measurement results may be displayed on monitor 28, as provided by block 210 in FIG. 9A (except for the reference numerals which were added for purposes of explanation). The display will, therefore, include an actual video image of the contour feature and fit line segments in one portion 28a of the monitor screen 28 and the measurement results in another portion 28b of the screen.

Block 212 permits indicating the other outer chamfer side edge or outer line either 176' or 177', as the reference and proceeds through the calculations again back at block 200 in FIG. 9A. Block 212 in FIG. 9A also corresponds to blocks 212', 212a' and 212b' in FIG. 6C which represent the menu options for switching or toggling the reference between the two side edges 187' and 177' under block 214, "H". After selecting the other reference (block 212') the program performs the calculation at block 200 in FIG. 9A, displays the new results, block 210, and returns to "H" or block 214 in FIG. 6C which presents other menu options: (1) printing the displayed results (block 216), (2) toggle the image (block 218) to turn on and off the display of the raw image data superimposed on the fit line segments in order to permit visual analysis of the image of the contour feature by the operator, or (3) returning to "A", the "MAIN MENU", at block 108 (block 220 in FIG. 6C) to set up for measuring another contour feature of the same part or a contour feature of a different component part.

It should be noted that the outer edges 176' and 177' of the chamfer do not necessarily extend from the intersecting chamfer edge 178' at the same angle, as evident from the difference in measurement of the distances "A" and "B", illustrated in FIG. 10 at reference numeral 320, which would be equal for a 45° chamfer. The chamfer may also be measured by the length of the extension of the reference line "A" to the intersection of the perpendicular "B" and the angle $\phi$ between the reference line "A" and the intersecting chamfer line 178'.

Figure 8B:
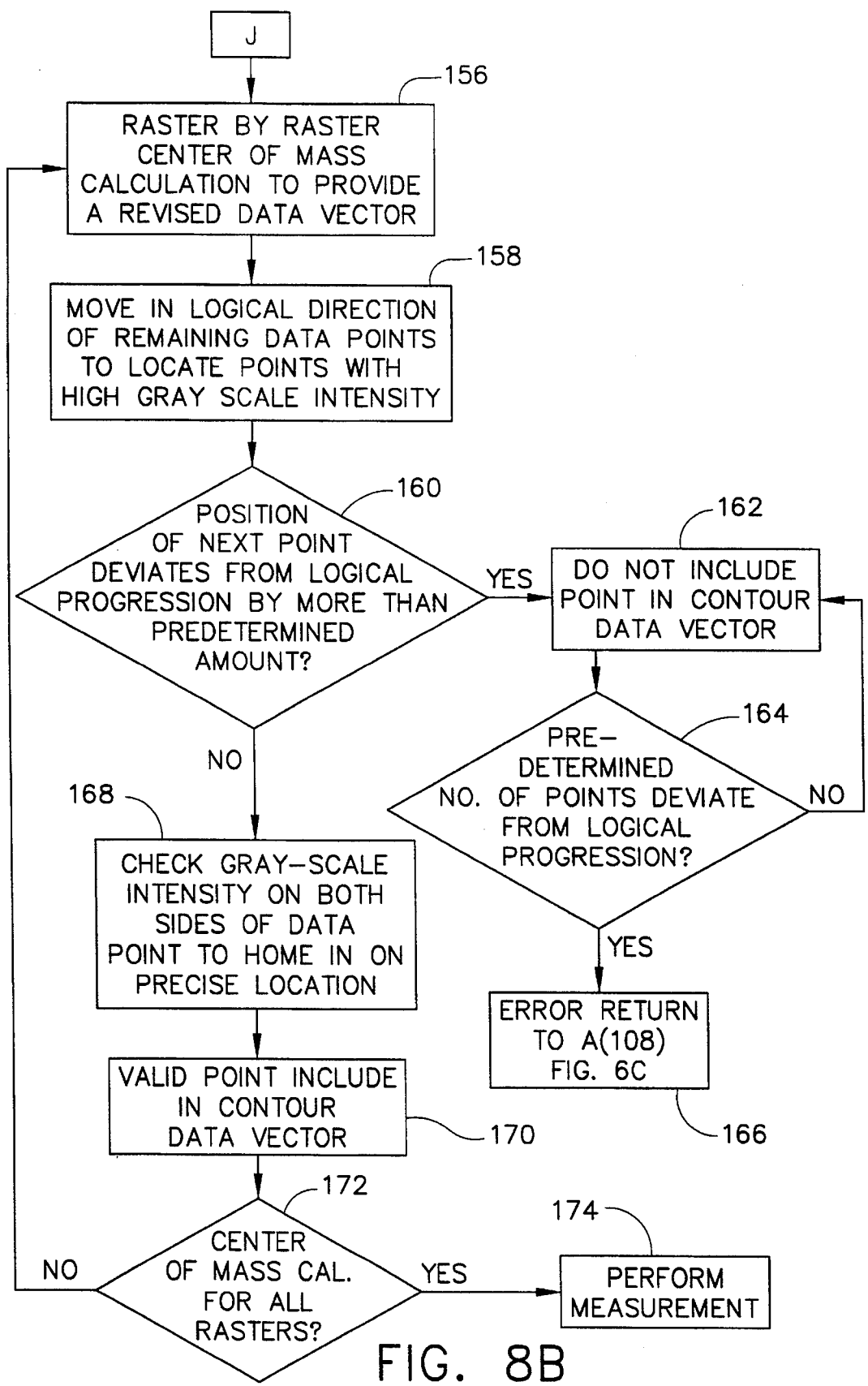

If the contour feature selected in the menu 104 under block 112 in FIG. 6B is a point-to-point measurement 132, then after a determination is made in block 139 of FIG. 6C that the image data received is satisfactory for performing a measurement (the filtering routine 138 previously described with reference to FIGS. 8A and 8B), the program will advance from the "MEASURE" block 174 and enter the point-to-point measurement routine, block 222 in FIG. 6C. This also corresponds to block 222' in FIG. 11 which is a flow graph for the point-to-point measurement.

Figure 12:
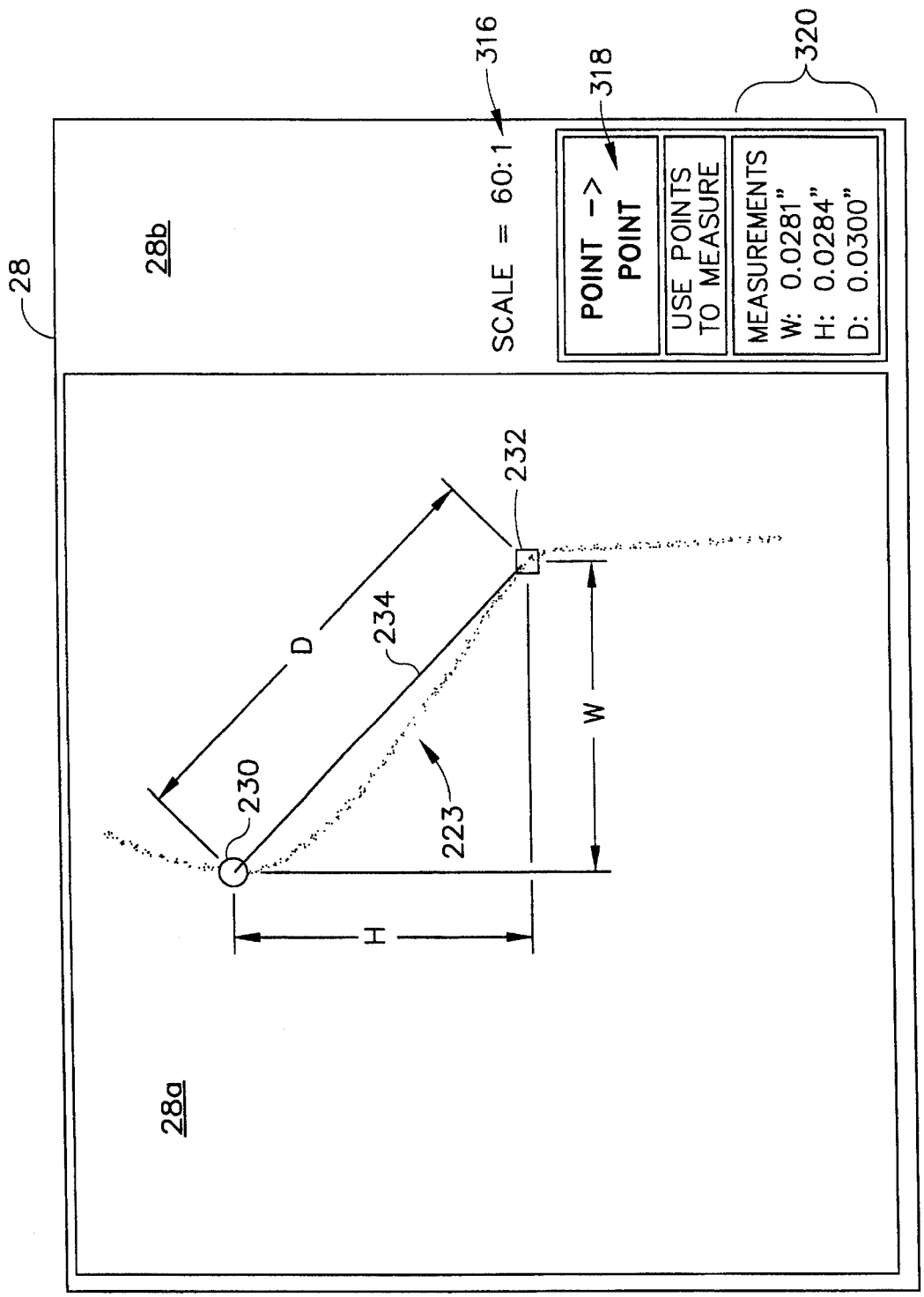
FIG. 12 is an illustration of the display of the apparatus of FIG. 1 showing the results of a point-to-point measurement.

The point-to-point contour measurement is accomplished by first positioning the measuring points on the contour feature image data represented by reference numeral 223 in FIG. 12, which is to be measured. Referring also to FIG. 6C and FIG. 12, one measurement point is represented by a small circle ○ (reference numeral 230 in FIG. 12) and the other measurement point is represented by a small square □ (reference numeral 232 in FIG. 12). The program will display a menu for movement and positioning of the measurement point ○, block 226 in FIG. 6C, and the measurement point □, block 228, and will permit movement of each of these measurement points, up, down, left or right, blocks 226a–d and 228a–d, respectively. As previously discussed, the menu may be scrolled by operation of the upper switch or push-button 68 on sensor 22 and fine or coarse movement of the measurement points 230 (○) and 232 (□) in the direction selected is accomplished by depressing lower switch or push-button 70 on sensor 22 whereby the measurement point, either 230 (○) or 232 (□), will move a distance according to the duration the push-button 70 is depressed. A "TOGGLE IMAGE" menu option 226e and 228e is provided for each measurement point 230 (○) and 232 (□) to permit turning on and off the display of the original raw gray level image of the contour feature which is superimposed under the contour data vector of the image and the measurement points 230 and 232. After the measurement points 230 and 232 have been positioned by the operator at their desired locations the program may be returned to "I", block 222, by selection of the "RETURN→I" option 226f or 228f in the menu.

Figure 11:
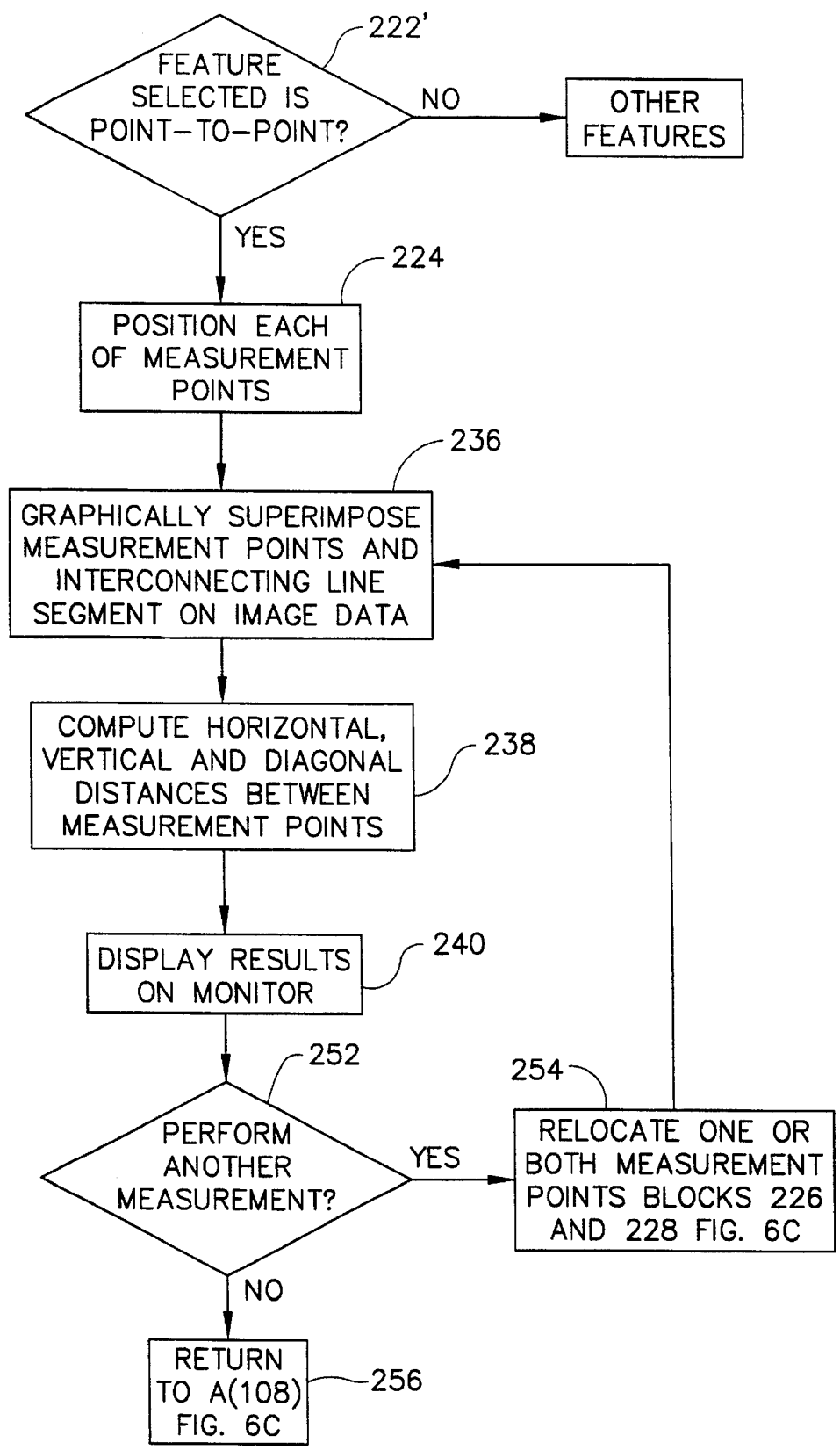
FIG. 11 is a flow graph of a method for performing a point-to-point measurement in accordance with the present invention.

Referring to FIGS. 11 and 12, the measurement points 230 and 232 and an interconnecting line segment 234 (FIG. 12) will be graphically superimposed on the image data 223, block 236 (FIG. 11). The horizontal distance ("W" in FIG. 12), vertical distance ("H" in FIG. 12) and diagonal distance ("D" in FIG. 12) between the measuring points 230 and 232 will be computed in block 238 and the results will be displayed on the monitor 28 as indicated by block 240. FIG. 12 illustrates how the point-to-point measurement results may be displayed on the monitor 28 except without the reference numerals and dimension symbols. The measurement results will include the scale 316 of the image, the type feature 318 measured and the parameters or characteristics 320 of the contour feature measured, in this case the width (W), height (H) and diagonal (D) distance between the measuring points 230 (○) and 232 (□).

Figure 6C:
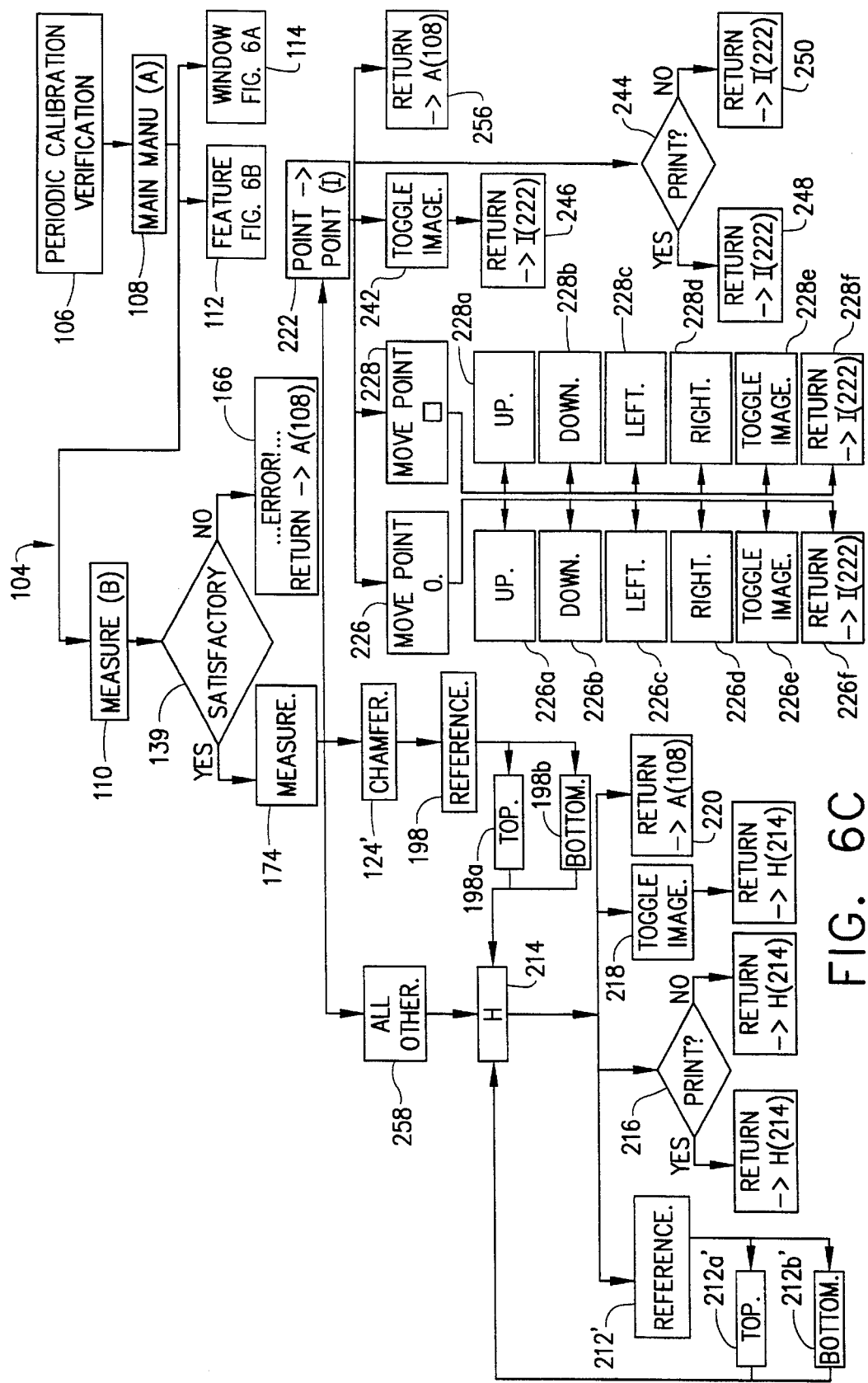

The menu 104 at block 242 in FIG. 6C permits toggling the display of the raw gray level contour image on or off. After toggling the image in block 242, the program will automatically return to "I", block 222 from block 246.

A menu option block 244 in FIG. 6C permits printing a hard copy of the results of the point-to-point measurement. After making a decision to print a hard copy or not, the menu may be returned to "I", block 222, by operation of either of the "RETURN→I" options, block 248 or 250. Returning to "I", block 222, permits repositioning of the measurement points 230 (○) and 232 (□) using menu options 226 and 228. This decision to perform another measurement and relocate one or both of the measurement points 230 and 232 is represented by blocks 252 and 254 in the flow graph of the point-to-point measurement illustrated in FIG. 11. If relocation of the measurement points 230 and 232 is not desired, a menu option, block 256 in FIG. 6C, is provided to return to "A" or the "MAIN MENU", block 108. This menu option is also represented by block 256 in the point-to-point flow graph in FIG. 11.

If the contour feature selected in the "MAIN MENU" 108 (FIG. 6B) under the "FEATURE" block 112 is other than a "CHAMFER" 124 or "POINT-TO-POINT" measurement 132, under the "MEASURE" block 174 in FIG. 6C, the program or menu 104 will proceed to "ALL OTHER", block 258, wherein measurements for the "BREAK EDGE" 122, "ROUND CORNER" 126, "SMOOTH CURVE" 128 or "TRUE RADIUS" 130 menu selections in FIG. 6B would be calculated. If the "BREAK EDGE" menu choice 122 was selected, also represented by block 122' in FIG. 13, the break edge is determined according to the method steps illustrated in the flow graph in FIGS. 13. If the break edge was not selected, the program would then advance to one of the other features represented by block 260 to perform the measurement of the particular contour feature selected in the menu 104 under the "FEATURE" block 112 (FIG. 6B).

Figure 13:
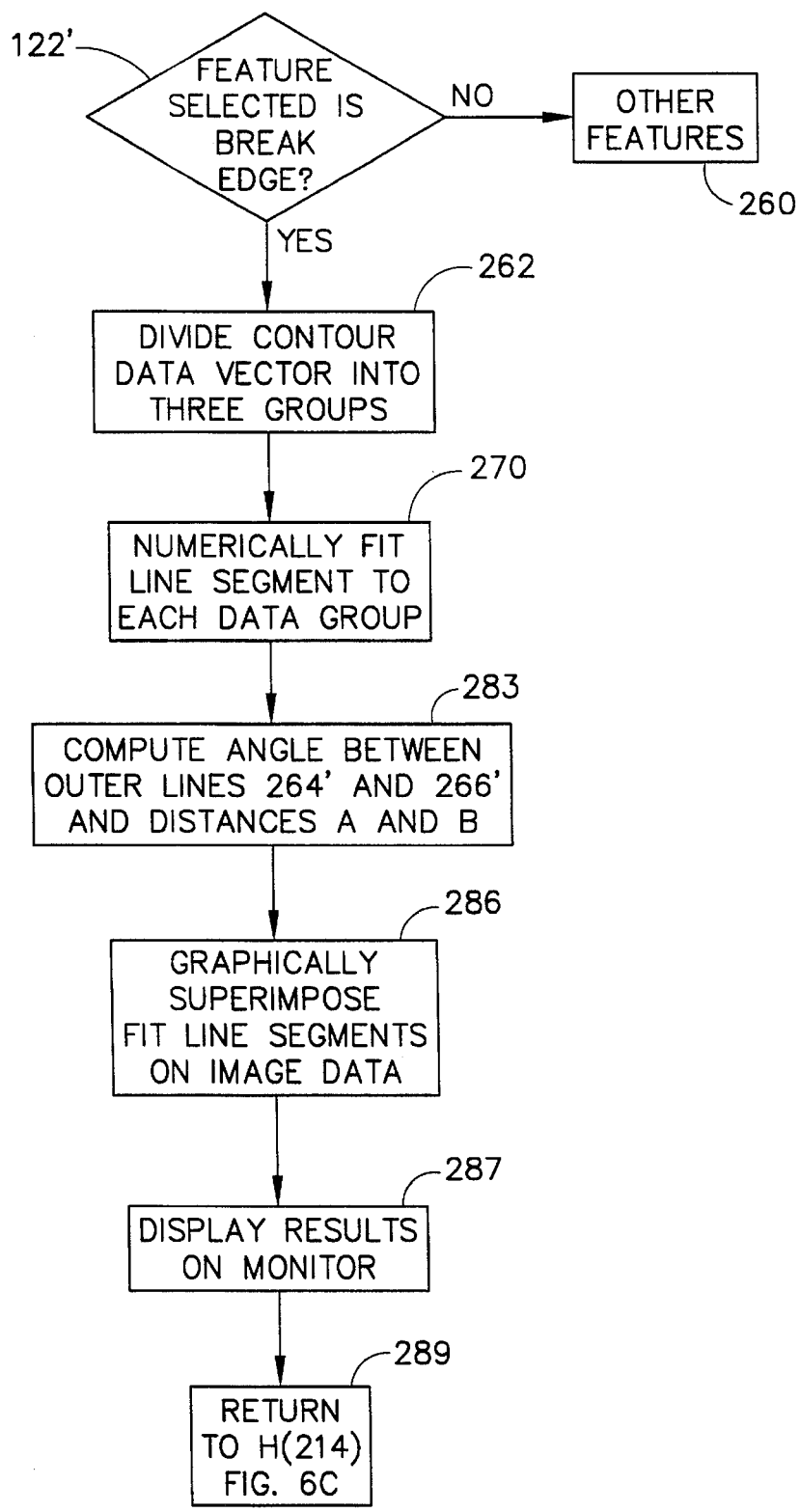
FIG. 13 is a flow graph of a method for performing a break edge measurement in accordance with the present invention.
Figure 14:
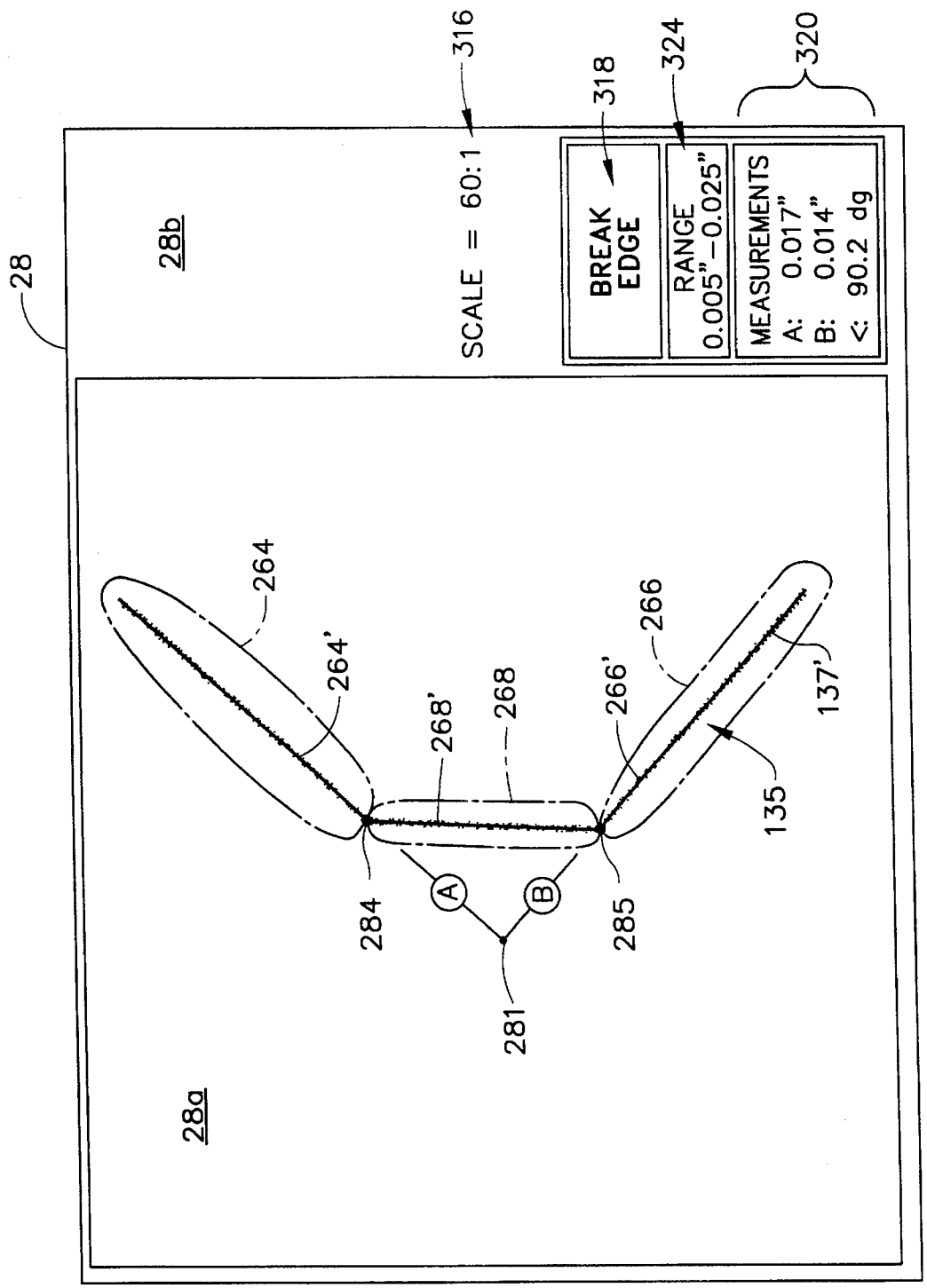
FIG. 14 is an illustration of the display of the apparatus of FIG. 1 showing the results of a break edge measurement in accordance with the present invention.

To measure the break edge from the image data 135 received by the camera 34 in sensor 22 (FIG. 1), the contour data 137' from the image of the feature is divided into three ordered and unique groups, block 262 in FIG. 13, corresponding to an upper or top side edge (enclosed in chain line 264 in FIG. 14), a lower or bottom side edge (enclosed in chain line 266) and an intersecting break edge (enclosed in chain line 268) intersecting the upper and lower side edges 264 and 266 as shown in FIG. 14. A line segment 264', 266' and 268' is numerically fit to each data group 264, 266 and 268, block 270 in FIG. 13. The line segments may be numerically fit to each respective data group in the same manner as that previously described with respect to the chamfer contour feature or by some other known curve fitting routine.

An angle "∠" between the outer side edge line segments 264' and 266' and the distances "A" and "B" are calculated in block 283. The distance "A" is measured between the point 281 and a point 284 (where the intersecting line 268' intersects upper outer line segment 264') and the distance "B" is measured between the point 281 and a point 285 (where the intersecting line 268' intersects lower line segment 266'). The fit line segments 264', 266' and 268' are superimposed on the image data, block 286, and are displayed on the monitor 28, and the results of the break edge measurement are also displayed on the monitor 28, block 287. FIG. 14 illustrates how the break edge superimposed data and the numerically fit line segments and measurement results may be displayed on the monitor 28 with the exception of the reference numerals and chain lines 264, 266 and 268 which have been added for purposes of explanation. The results displayed in monitor portion 28b may include the scale 316 of the image, the contour feature measured 318, the range of the measurements 324 and the actual contour characteristics measured 320; in the case of a break edge, the lengths of "A" and "B" and the angle "∠" between the side edges 264' and 266' are displayed.

After displaying the measurement results, the superimposed line segments and image data, from block 289 in FIG. 13, the program returns to "H" or block 214 in FIG. 6C. Under "H", block 214, the menu 104 provides the option to print a hard copy of the results shown in FIG. 14 by selecting the "yes" option to the "PRINT? " decision block 216. Additionally, menu options under block 214 include the option to toggle on or off the display of the raw gray level contour image to permit viewing the raw image superimposed under the numerically fit line segments (block 218), and block 220 permits returning to "A" the "MAIN MENU" block 108.

Figure 15A:
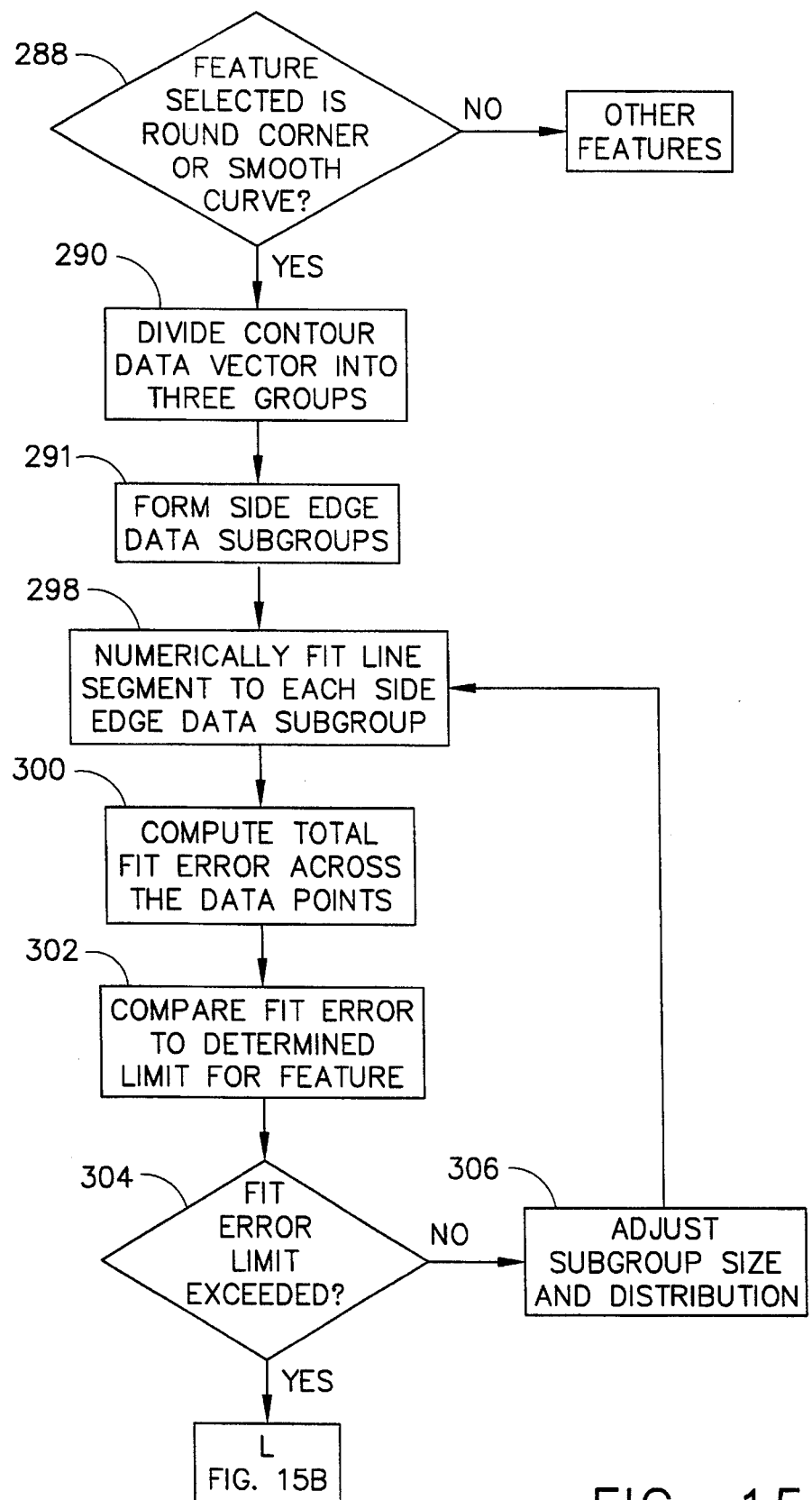
FIGS. 15A and 15B are a flow graph of a method for measuring a round corner or smooth curve in accordance with the present invention.
Figure 15B:
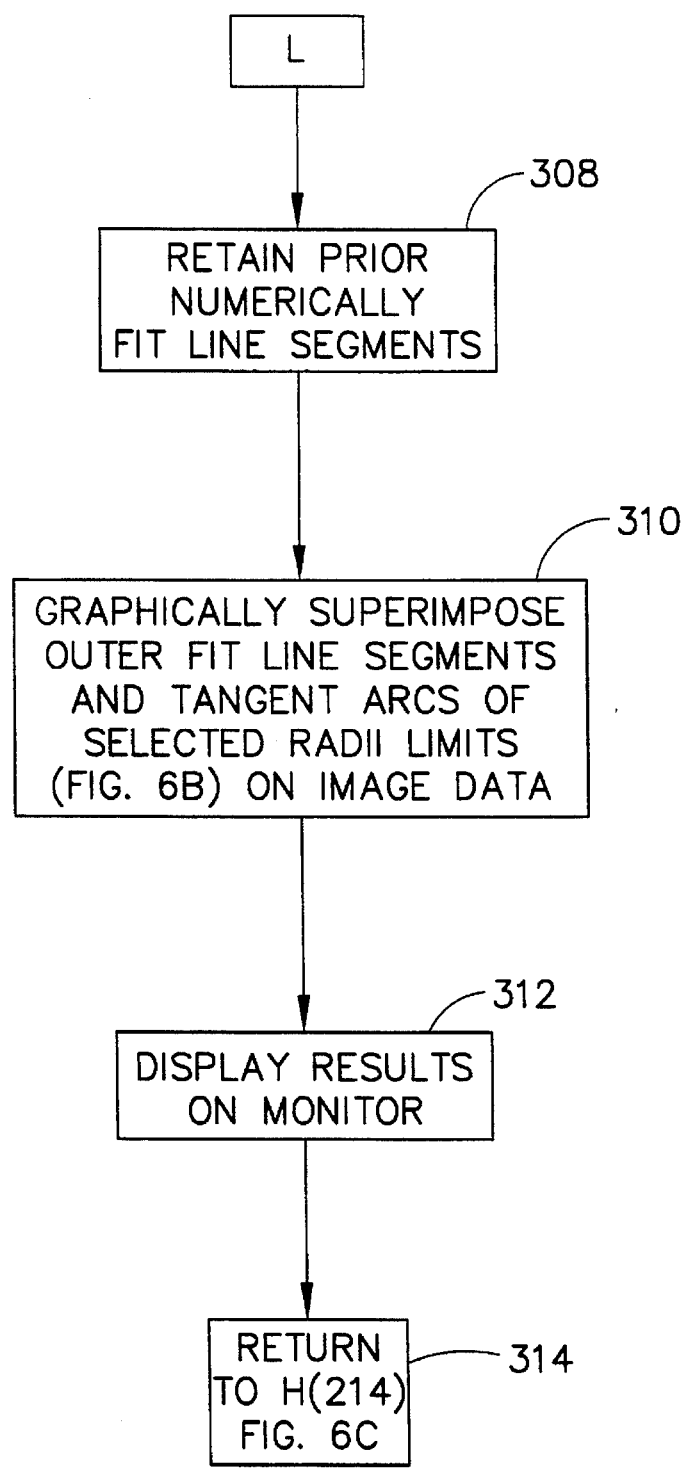

Referring to FIG. 15A and 15B, if the "ROUND CORNER" or "SMOOTH CURVE" contour feature 126 or 128 is selected under the "FEATURE" menu option 112 in FIG. 6B, as previously discussed, the menu 104 permits selecting the limits 133 or 134 within which the radius of the curve or round corner will desirably fit. These limits will be known for the particular feature to be measured and would typically come from the specification for the part or a drawing of the part. The round corner and smooth curve are determined by virtually the same steps and will be described simultaneously. The round corner or smooth curve selection under block 112 is represented by decision block 288 in FIG. 15A. The contour data vector 137' derived from the raw image data 135, which may be determined by a method similar to that described with respect to FIGS. 7A and 7B, is divided into three ordered and unique data groups in block 290 which correspond to the different constituents making up the smooth curve or round corner, namely, an upper side edge data group enclosed by a chain line 292 in FIG. 16, a lower side edge data group enclosed by a chain line 294 and a curved intersecting edge data group enclosed by a chain line 296, which tangentially intersects the upper and lower side edge data groups 292 and 294. Data subgroups are formed in block 291 from the side edge data groups 292 and 294 in a manner similar to that previously described with respect to the chamfer measurement (FIG. 9C), and a line segment is numerically fit to each side edge data subgroup in block 298 by a least squares fit method similar to that previously discussed for the chamfer and the break edge or by another known curve fitting routine. A total fit error across the data points is computed in block 300 and the fit error is compared to a predetermined limit for the round corner or smooth curve contour feature in block 302. The predetermined limit may be determined empirically from different round corner or smooth curve contour features of known dimensions. If the fit error limit is exceeded in block 304, the size and distribution of the data subgroups are adjusted in block 306 and the new side edge data subgroups are numerically fit again in block 298, a new total fit error is computed in block 300 and the new total fit error is compared again to the fit error limit in block 302. If the fit error limit has been exceeded in block 304, this is an indication that data has been added to the outer side edges 292 and 294 which is not part of the line segment data and the program will retain the prior numerically fit line segments in block 308 of FIG. 15B.

Figure 16:
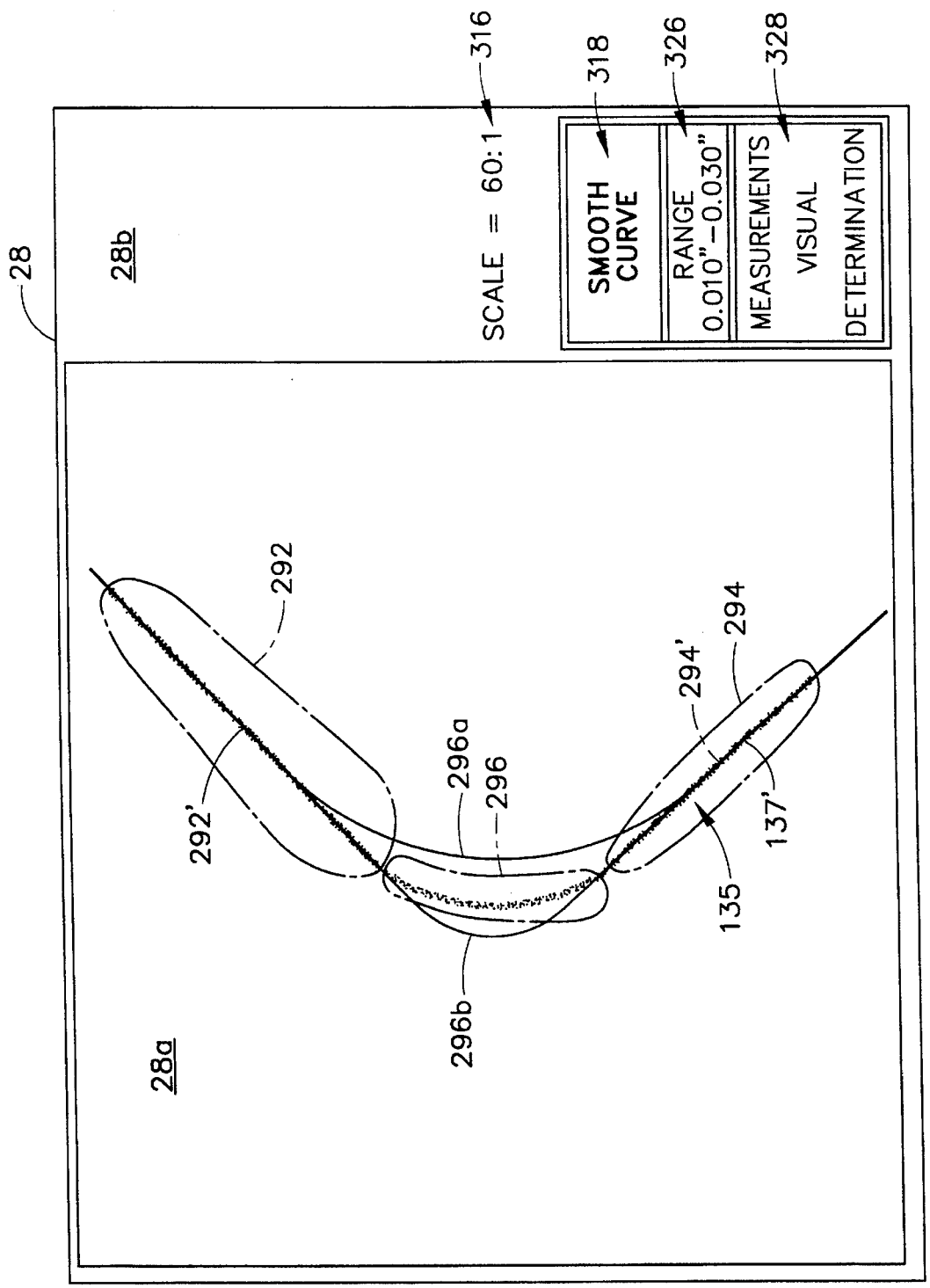
FIG. 16 is an illustration of the display of the apparatus of FIG. 1 showing the results of a smooth curve or round corner measurement.

The outer numerically fit line segments 292' and 294' are graphically superimposed on the image data 135 in block 310 and tangential arcs 296a and 296b, corresponding to the radii limits 133 or 134 selected in the menu illustrated in FIG. 6B, are also superimposed on the image data as shown in FIG. 16. FIG. 16 illustrates how the round corner or smooth curve line segments 292' and 294' and selected tangential arcs 296a and 296b are superimposed on the image data 135 and displayed on the monitor 28 in portion 28a. Also displayable on the monitor 28 in portion 28b are the measurement results, block 312 in FIG. 15B, including the scale 316 of the image, the contour feature 318 measured, the radii limits or range 326 selected and a statement 328 of the evaluation basis.

After the measurement, the program returns to "H", block 214 in FIG. 6C, and the menu 104 provides the options to print (block 216) a copy of the smooth curve measurement results as shown in FIG. 16, to toggle the display of the raw image data on and off to permit separate viewing of the superimposed fit line segments 292' and 294' and the tangential arcs 296a and 296b, either with or without the image data (block 218), or to return to "A", the "MAIN MENU" at block 108 (block 220) to set up for another measurement.

Figure 17:
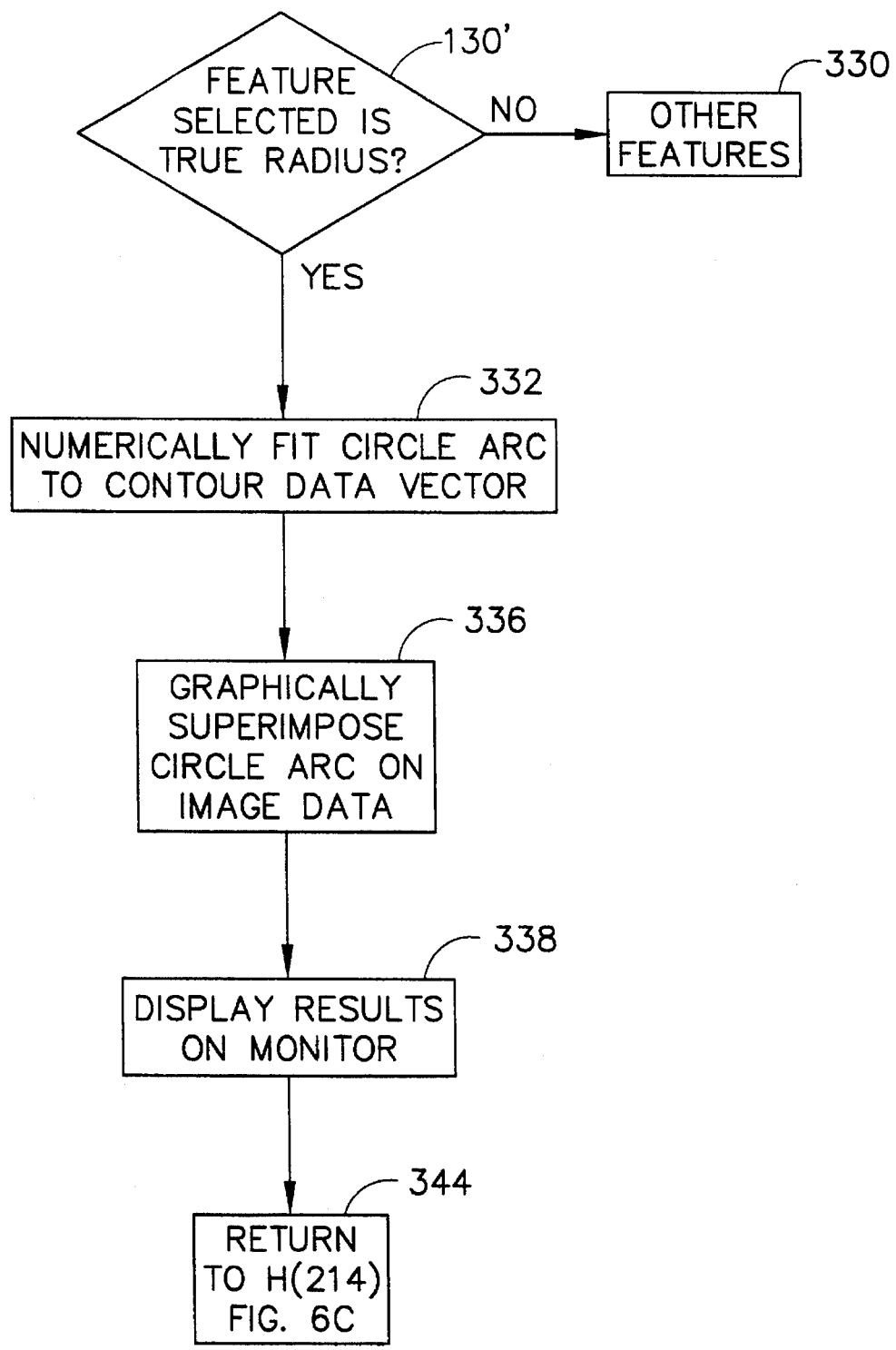
FIG. 17 is a flow graph of a method for measuring a true radius in accordance with the present invention.
Figure 18:
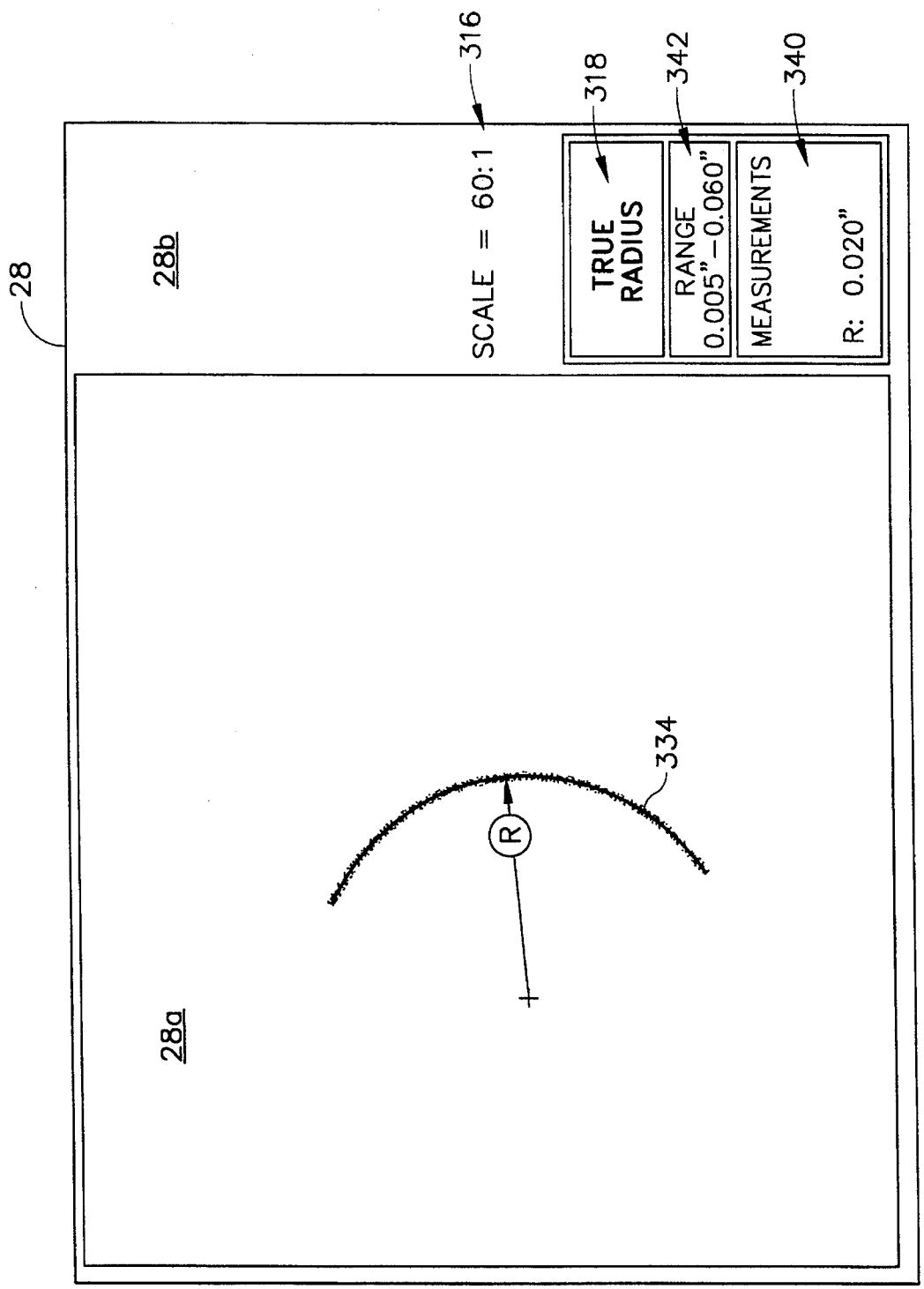
FIG. 18 is an illustration of the display of the apparatus of FIG. 1 showing the results of a true radius measurement in accordance with the present invention.

If the "TRUE RADIUS" option 130 under the "FEATURE" option 112 of FIG. 6B is selected, the true radius will be determined according to the steps in the flow graph illustrated in FIG. 17. The selection of the true radius under block 112 is represented by the decision block 130' in FIG. 17. If another feature was selected to be measured, the program will advance to block 330 which represents one of the other features selected in the menu on FIG. 6B. In block 332, a circle arc 334 is numerically fit to the contour data vector derived from the image as illustrated in FIG. 18. The numerically fit arc is then graphically superimposed on the image data in block 336 and the results of the measurement are displayed on monitor 28 (FIG. 1) in block 338. FIG. 18 illustrates the results of the true radius measurement displayed on monitor 28 and shows the numerically fit arc 334 superimposed over the image data. Along with the image, the results displayed may include the scale of the image 316, the contour feature 318 measured, the radius 340 of the arc 334 and the range 342 of radius values within which the measurement falls as shown in FIG. 18. Block 344 returns the program to "H", block 214, in FIG. 6C where, as previously described, the menu options are displayed to print (block 216) the displayed results, toggle the image (block 218) or to return to "A", the "MAIN MENU" 108 (block 220).

In a further embodiment of the present invention, the outer line fitting steps (blocks 298, 300, 302, 304, 306 and 308 in FIGS. 15A and 15B) of the round corner or smooth curve measurement procedure may be combined with the arc fitting step (block 332 in FIG. 17) of the true radius measurement to provide a hybrid methodology for fitting the upper and lower side edges 292 and 294 in FIG. 16 and the curved intersecting edge 296 of the round corner or smooth curve. The desired geometric parameters may then be calculated from the numerically fit contour line segments, such as radius of the curved intersecting edge 296, the "φ" of intersection between the outer side edges 292' and 294' or similar geometric measurements.

Figure 19A:
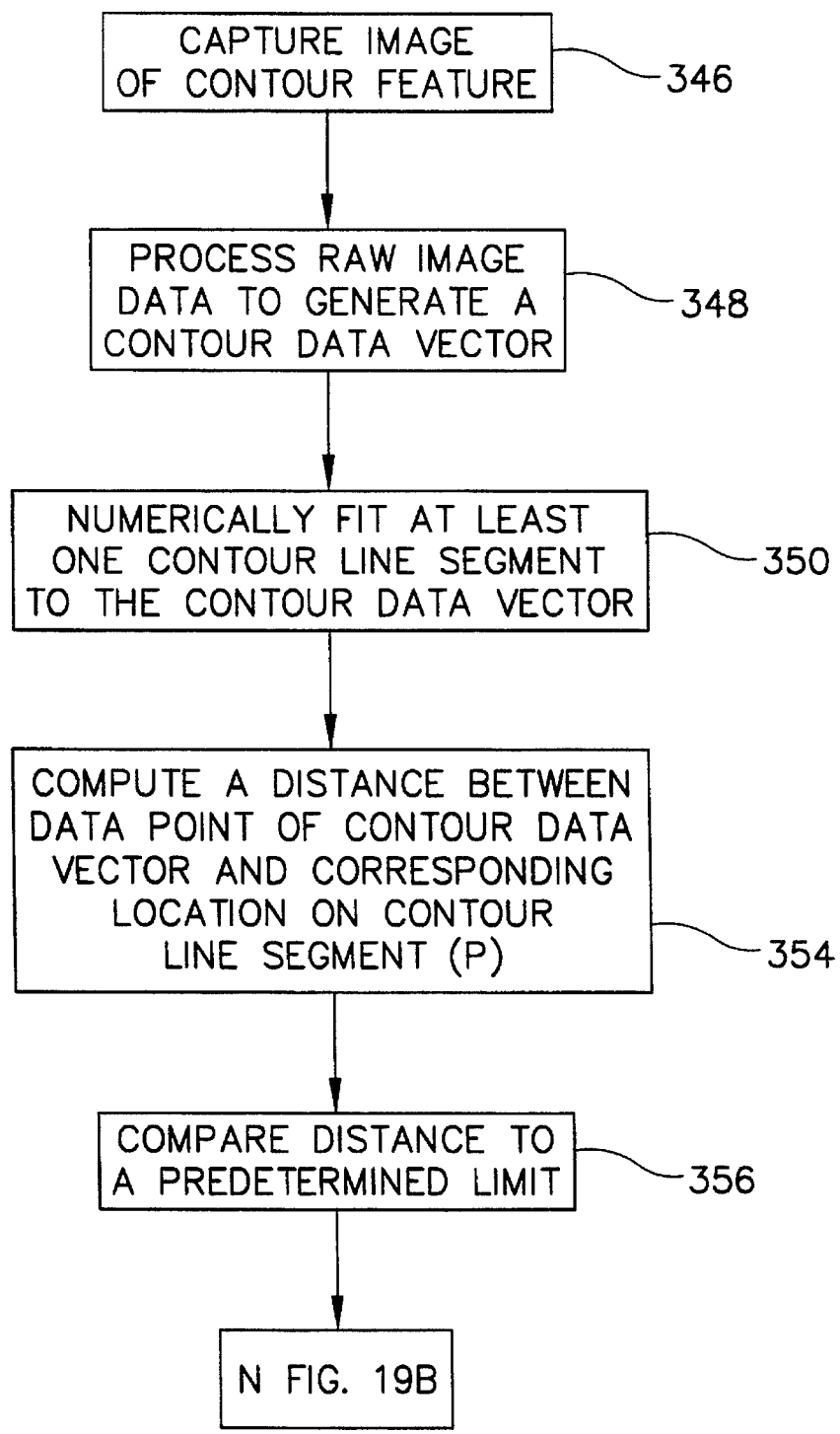
FIGS. 19A and 19B are a flow graph of a method for inspecting a contour feature for discontinuities in accordance with the present invention.
Figure 19B:
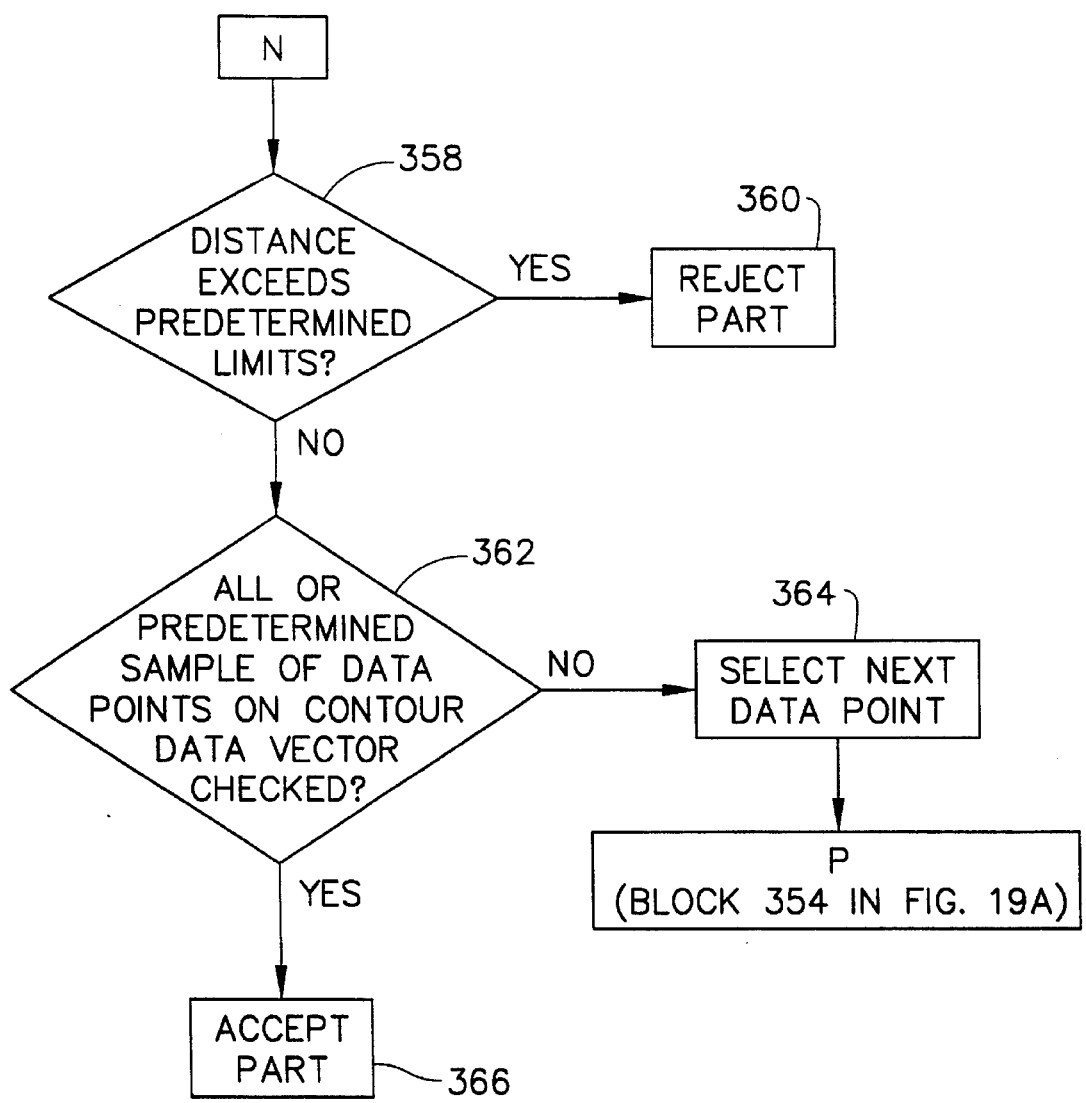
Figure 20:
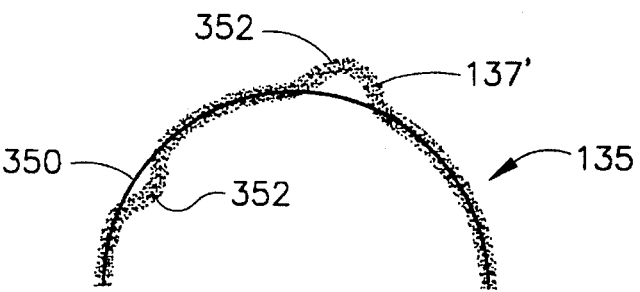
FIG. 20 is an illustration of an image of a contour feature being inspected in accordance with the method represented in FIGS. 19A and 19B.

Referring to FIGS. 19A, 19B and 20, the apparatus 20 (FIG. 1) of the present invention may also be used to inspect contour features for discontinuities or defects. Initially, the sensor 22 of apparatus 20 is positioned to project the line of laser light 56 onto the selected contour feature 50, as shown in FIG. 3. The camera 34 in sensor 22 will then capture an image of the selected contour feature 50 as indicated in block 346 of FIG. 19A. The raw image data 135 received by the camera 34 is then processed by the apparatus 20 to generate a contour data vector 137', block 348 in FIG. 19A, similar to that previously described with respect to FIG. 7A and 7B, wherein the contour feature is represented by a single data point in each raster of the image. At least one contour line segment 350 is numerically fit to the contour data vector 137' by a least squares fit analysis similar to that previously described or by some other known curve-fitting routine. Because of the nature of the least squares fit analysis, the fit contour line segment 350 will track a smooth contour and will not follow discontinuities or abnormalities in the contour data vector 137' (FIG. 20) of the image which result from actual discontinuities or abnormalities 352 in the actual contour feature under inspection. The contour data vector 137' will, therefore, track or follow the abnormalities 352 or discontinuities in the image of the actual part, but the numerically fit contour line segment 350 will track or follow a logical progression of the image data points without the discontinuities 352. The contour line segment 350, therefore, corresponds to the desired actual component or part contour without abnormalities or discontinuities 352. A distance between a data point on the contour data vector 137' and a corresponding location or data point on the numerically fit contour line segment 350 are computed in block 354, and this distance is compared to a predetermined limit in block 356 of FIG. 19A. In block 358, if the distance exceeds the predetermined limit then the part is rejected, block 360, or the program goes on to check other data points as indicated by blocks 362 and 364. If all or a predetermined sample of data points have been checked as indicated in decision block 362 and none of the distances between data points of the contour data vector 137' and corresponding locations on the contour line segment 350 have exceeded the predetermined limit in block 358, then the part will be accepted in block 366.

Figure 22A:
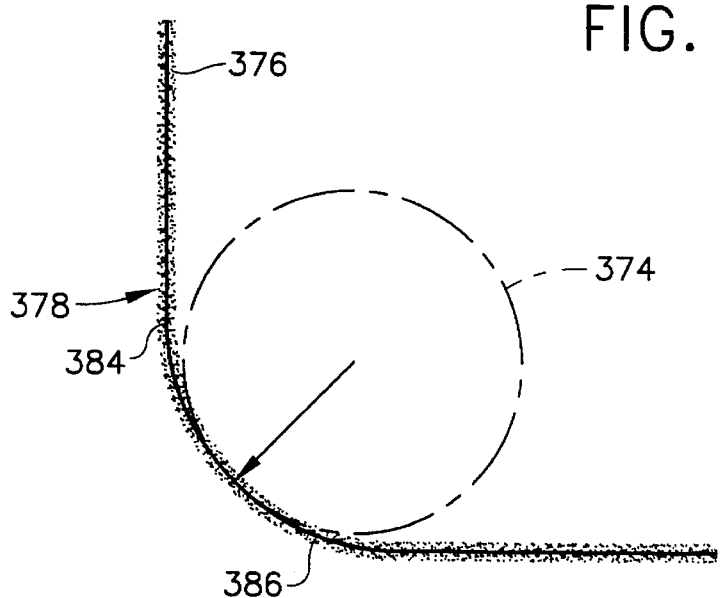
FIGS. 22A and 22B are illustrations of images of a contour feature being inspected in accordance with the method represented of FIG. 21A and 21B.
Figure 22B:
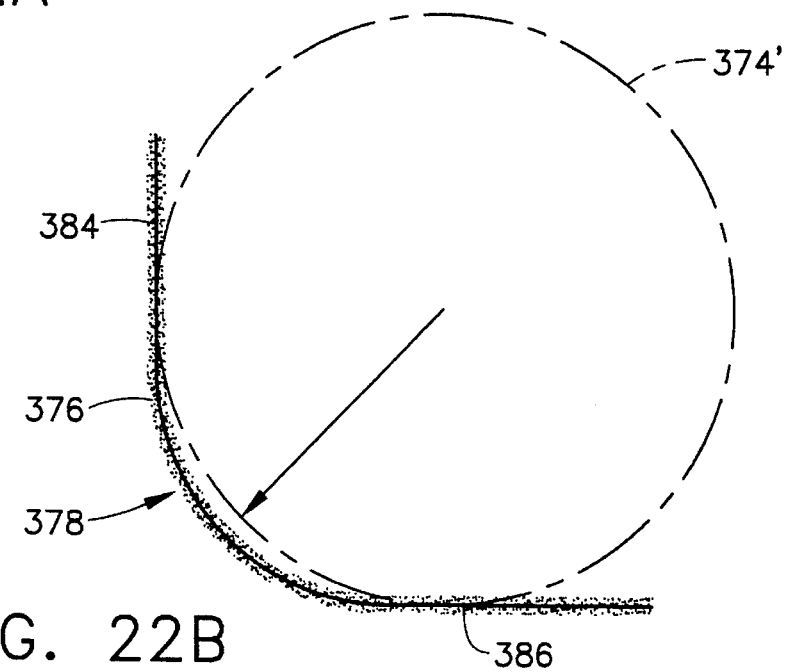
Figure 21:
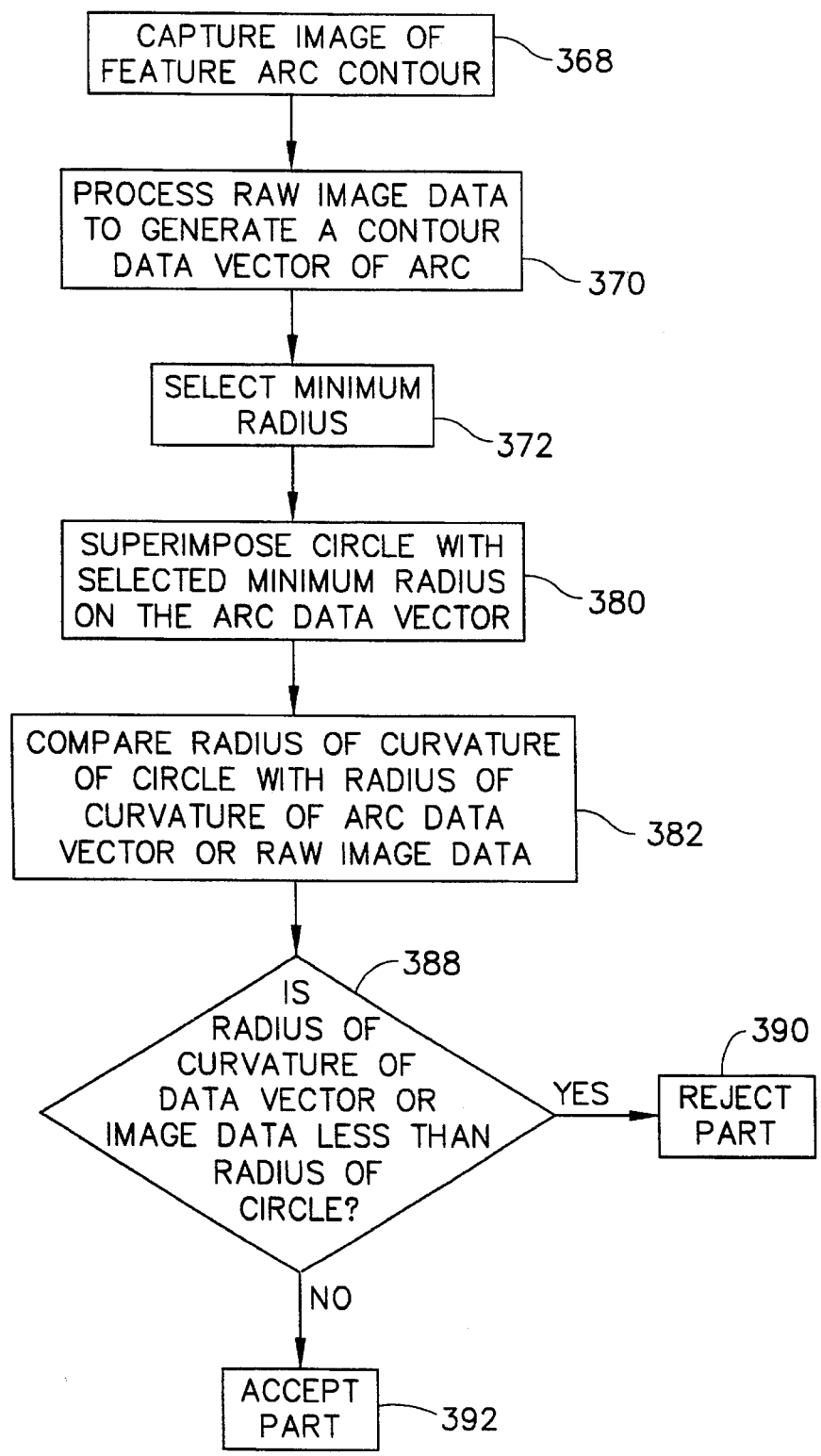
FIGS. 21A and 21B are a flow graph of a method of inspecting a contour feature for a radius of curvature less than a predetermined minimum radius of curvature in accordance with a further embodiment of the present invention.

In another application of the apparatus 20 of the present invention, a contour feature or arc of a component may be inspected to determine if the contour feature or arc has a radius less than a minimum specified radius which would indicate that the part may be susceptible to the formation of stress cracks which could shorten the useful life of the component. A method for performing a minimum radius inspection of a contour feature of a part is illustrated in flow graph form in FIGS. 21A and 21B. Initially, the image of the contour feature is captured by the sensor 22, as indicated by block 368. The raw image data 378 is then processed in a manner similar to that previously described to generate a contour data vector 376 of the contour feature as indicated in block 370. A minimum radius is selected in block 372 which may be the minimum radius specified on a drawing for the part. A circle 374 or 374', as shown in FIG. 22A or 22B, with a radius corresponding to the selected minimum radius is superimposed in block 380 on the arc data vector 376 and/or the raw image data 378 as shown in FIG. 22A and FIG. 22B. In block 382, the radius of curvature of the circle 374 or 374' with the selected minimum radius is compared with the radius of curvature of the arc data vector 376 or raw image data 378. If the radius of curvature of the arc data vector 376 or raw image data 378 is less than the radius of the circle 374 or 374', the part is rejected in block 390; otherwise, the part is accepted in block 392. FIG. 22A illustrates an example where the radius of curvature of the data vector 376 or raw image data 378 is greater than the radius of the circle 374 and, therefore, the part would be acceptable. FIG. 22B illustrates the situation where the radius of curvature of the arc data vector 376 or the raw image data 378 is smaller than the selected minimum radius of the circle 374' and, therefore, this part would be rejected.

While the present invention has been described primarily with application to measuring contour features including break edges, chamfers, round corners, smooth curves, true radii and point-to-point measurements, or inspecting a contour feature for discontinuities or for a radius less than specified, those skilled in the art will recognize that the principles of the present invention and the optical contour measuring apparatus or system described can easily be modified or adapted to measure different types of contour surfaces and that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for measuring the contour of a surface, comprising the steps of:
   (a) projecting a line of light on the surface to illuminate a selected contour feature of the surface:
   (b) generating an image of the selected contour feature illuminated by the line of light by imaging an off-axis projection of light reflected from the illuminated contour feature; and
   (c) evaluating the selected contour feature by comparing the image against a predetermined specification;
   wherein any distortion and keystone effect in the image caused by off-axis imaging of the illuminated contour feature is corrected by the steps of;
   positioning a square grid within the field of view of an image generating means to provide an off-axis image of the square grid;
   superimposing an electronically produced grid corresponding to the square grid over the off-axis image of the square grid;
   adjusting the vertical and horizontal grid lines of the electronically produced grid to match the convergence of the vertical and horizontal grid lines of the off-axis square grid image;

storing a vertical and a horizontal convergence adjustment parameter corresponding to a displacement of the electronically produced grid lines to match the grid lines of the off-axis image;

adjusting the vertical and horizontal grid lines of the electronically produced grid to match the spacing between the vertical and horizontal grid lines of the off-axis square grid image; and storing a vertical and horizontal spacing adjustment parameter corresponding to a displacement of the electronically produced grid lines to match the grid lines of the off-axis image, the convergence adjustment parameters and the spacing adjustment parameters being used to correct the off-axis image of the illuminated contour feature.

\* \* \* \* \*